United States Patent
Koufaty et al.

(10) Patent No.: US 12,386,772 B2
(45) Date of Patent: Aug. 12, 2025

(54) TECHNOLOGIES FOR INCREASING LINK EFFICIENCY

(71) Applicant: Intel Corporation, Santa Clara, CA (US)

(72) Inventors: David A. Koufaty, Portland, OR (US); Rajesh M. Sankaran, Portland, OR (US); Utkarsh Y. Kakaiya, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 876 days.

(21) Appl. No.: 17/380,712

(22) Filed: Jul. 20, 2021

(65) Prior Publication Data
US 2021/0374087 A1    Dec. 2, 2021

(51) Int. Cl.
| | | |
|---|---|---|
| *G06F 13/42* | (2006.01) | |
| *G06F 9/50* | (2006.01) | |
| *G06F 9/54* | (2006.01) | |
| *G06F 13/40* | (2006.01) | |

(52) U.S. Cl.
CPC ........ *G06F 13/4221* (2013.01); *G06F 9/5016* (2013.01); *G06F 9/5022* (2013.01); *G06F 9/546* (2013.01); *G06F 13/404* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 6,516,375 B1 * | 2/2003 | Ajanovic | G06F 13/4027 710/305 |
| 8,917,734 B1 | 12/2014 | Brown | |
| 10,037,689 B2 * | 7/2018 | Taylor | G05D 1/0285 |
| 10,853,277 B2 * | 12/2020 | Liang | G06F 13/28 |
| 11,080,336 B2 * | 8/2021 | Van Dusen | G06N 5/02 |
| 11,698,860 B2 * | 7/2023 | Raval | G06F 12/063 711/202 |
| 2006/0165040 A1 * | 7/2006 | Rathod | G06Q 10/10 370/335 |
| 2007/0147426 A1 | 6/2007 | Sharma et al. | |

(Continued)

OTHER PUBLICATIONS

EPO; Extended European Search Report issued in EP Patent Application No. 22185893.9, dated Dec. 1, 2022; 7 pages.

(Continued)

*Primary Examiner* — Henry Tsai
*Assistant Examiner* — Christopher A Bartels
(74) *Attorney, Agent, or Firm* — Alliance IP, LLC

(57) ABSTRACT

Techniques for increasing link efficiency are disclosed. In one embodiment, a device handle table is created at each end of a link. Device handle allocation messages can be used to associate a particular device handle with a particular domain identifier, such as a bus/device/function (BDF) identifier or a processor address space identifier (PASID). Once a device handle is allocated, messages can be sent between the two ends of the link that include the device handle. The device handle can be used to determine the domain identifier associated with the message. As the device handle can be fewer bits than the domain identifier, the link efficiency can be increased.

21 Claims, 12 Drawing Sheets

(56) References Cited

U.S. PATENT DOCUMENTS

| | | | |
|---|---|---|---|
| 2012/0236734 A1* | 9/2012 | Sampath | H04L 12/4641 |
| | | | 370/252 |
| 2020/0019515 A1* | 1/2020 | Koufaty | G06F 12/1483 |
| 2020/0021540 A1 | 1/2020 | Marolia et al. | |
| 2021/0004338 A1* | 1/2021 | Marolia | G06F 3/0655 |
| 2021/0042254 A1* | 2/2021 | Marolia | G06F 13/4295 |
| 2021/0064525 A1* | 3/2021 | Tian | G06F 12/1081 |
| 2021/0374056 A1* | 12/2021 | Malladi | G06F 12/0891 |

OTHER PUBLICATIONS

"Compute Express Link (TM) / CXL(TM)," Specification, Revision 2.0; Oct. 2020; 628 pages.
"Intel(R) Trust Domain Extensions," White Paper, Intel Corporation; 9 pages.
"PCI Express(R) Device Security Enhancements," Version 0.71, Intel Corporation; Sep. 2018; 46 pages.

* cited by examiner

DEVICE HANDLE TABLE
600

| DEVICE HANDLE ID | PASID | BDF | TRUSTED | VALID |
|---|---|---|---|---|
| 1 | 0x34BA3 | 0xFF23 | 0 | 1 |
| 2 | 0xFF052 | 0x053A | 1 | 1 |
| 3 | 0x00000 | 0xA8C2 | 0 | 0 |
| 4 | 0x005A2 | 0x9DF3 | 0 | 1 |
| 5 | 0x00000 | 0x18D6 | 1 | 1 |

FIG. 6

TECHNOLOGIES FOR INCREASING LINK EFFICIENCY

BACKGROUND

Messages sent between components of a compute device may include domain identifiers indicating a domain associated with the message. For example, messages between a CPU and an offload device or accelerator connected through a link such as PCIe may include a bus/device/function (BDF) identifier and/or a processor address space identifier (PASID) to identify a domain associated with the messages. A domain may be associated with various entities, for example a combination of BDF and PASID may be associated with a virtual machine in a virtual environment or for each process in a non-virtual environment. For relatively long messages, a relatively long domain identifier does not significantly affect the efficiency of the link. However, for relatively short messages, a relatively long domain identifier included in the header of each message can affect the overall efficiency of the link.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 6 illustrates a table that may be implemented by the computing system of FIG. 1.

DETAILED DESCRIPTION OF THE DRAWINGS

Figure 1:
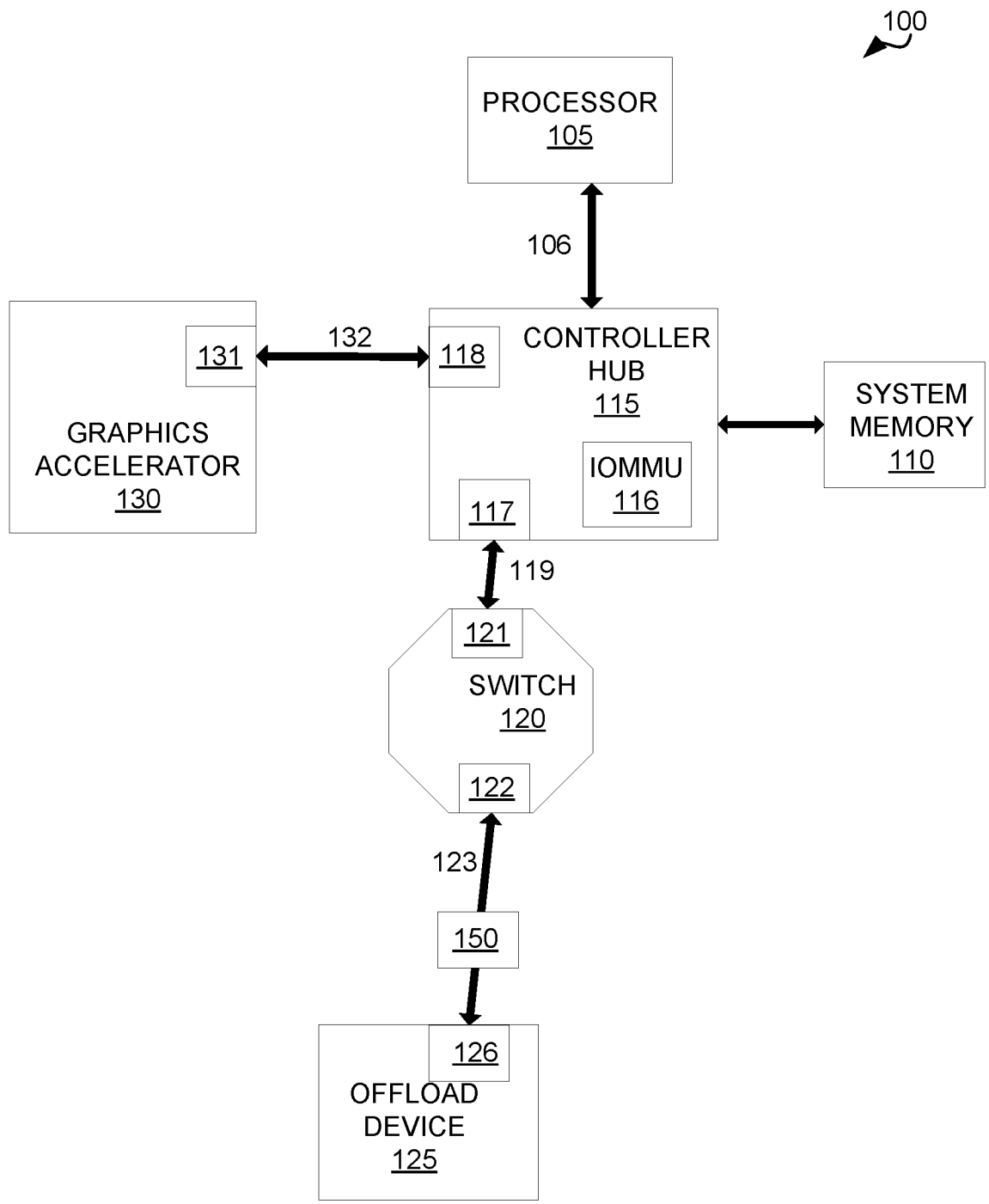
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages, and operation, etc. in order to provide a thorough understanding of the present disclosure. It will be apparent, however, to one skilled in the art that these specific details need not be employed to practice embodiments of the present disclosure. In other instances, well-known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system haven't been described in detail in order to avoid unnecessarily obscuring embodiments of the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™ and may also be used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the present disclosure.

Referring to FIG. 1, an embodiment of a fabric composed of point-to-point Links that interconnect a set of components is illustrated. System 100 includes processor 105, controller hub 115, and system memory 110 coupled to controller hub 115. Processor 105 includes any processing element, such as a microprocessor, a host processor, an embedded processor, a co-processor, or other processor. Processor 105 is coupled to controller hub 115 through front-side buses (FSB) 106, respectively. It should be appreciated that, in some embodiments, the computing system 100 may include more or fewer processors. In computing systems 100 with more processors, each pair of processors may be connected by a link 109. In one embodiment, FSB 106 is a serial point-to-point interconnect as described below. In another embodiment, link 106 includes a serial, differential interconnect architecture that is compliant with different interconnect standard, such as a Quick Path Interconnect (QPI) or an Ultra Path Interconnect (UPI). In some implementations, the system may include logic to implement multiple protocol stacks and further logic to negotiation alternate protocols to be run on top of a common physical layer, among other example features.

System memory 110 includes any memory device, such as random access memory (RAM), non-volatile (NV) memory, or other memory accessible by devices in system 100. In the illustrative embodiment, the system memory 110 is coupled to the controller hub 115. Additionally or alternatively, in some embodiments, the system memory 110 is coupled to processor 105 though a memory interface. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processors 105, while controller 115 is to communicate with I/O devices, in a similar manner as described below. In some embodiments, peer-to-peer routing is optionally supported through root complex 115.

The controller hub 115 also includes an input/output memory management unit (IOMMU) 116. In some embodiments, the IOMMU 116 may be referred to as a translation agent. In the illustrative embodiment, the IOMMU 116 forms part of the controller hub 115. Additionally or alternatively, in some embodiments, some or all of the IOMMU 116 may be a separate component from the controller hub 115. The IOMMU 116 can include hardware circuitry, software, or a combination of hardware and software. The IOMMU 116 can be used to provide address translation services (ATS) for address spaces in the memory 110 to allow one or more of the offload devices 125 to perform memory transactions to satisfy job requests issued by the host system.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120. In some embodiments, the port 117 may be referred to as a root port 117.

Switch/bridge 120 routes packets/messages from offload device 125 upstream, i.e., up a hierarchy towards a root complex, to controller hub 115 and downstream, i.e., down a hierarchy away from a root controller, from processor 105 or system memory 110 to offload device 125. Switch 120, in one embodiment, is referred to as a logical assembly of multiple virtual PCI-to-PCI bridge devices. Offload device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, an accelerator device, a field programmable gate array (FPGA), an application specific integrated circuit, and other input/output devices. Often in the PCIe vernacular, such as device, is referred to as an endpoint. Although not specifically shown, offload device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly offload device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

In use, in some embodiments, the offload device 125 (or any other device connected to the processor 105, such as the graphics accelerator 130) may support different domains. For example, the offload device 125 may support multiple virtualized functions, each of which corresponds to a different domain. In one example, the offload devices 125 may support different tenants of a single root I/O virtualization (SR-IOV) offload device. The different domains may share physical memory (e.g., on the offload device 125 or on the system memory 110). The offload device 125 can send and receive various messages across the link 123 and, after going through the switch 120, the link 119 such as memory transactions, cache coherency messages, etc. In order to enforce isolation between the tenants, messages such as memory requests may include a domain identifier that identifies, e.g., a particular virtual function associated with the message.

Messages on the link 123 may include untranslated addresses, such as a guest virtual address (GVA), guest physical address (GPA) or IO virtual address (IOVA) or may include a translated address, such as a host physical address (HPA). For untranslated addresses, an IOMMU 116 performs address translation from GPA, GPA or IOVA to HPA to allow the offload device access to system memory 110.

For example, in one embodiment, an Address Translation Service (ATS) on the IOMMU 116 may allow the offload device 125 to cache a translated address (i.e., an HPA) in a device translation lookaside buffer to improve performance, such as by avoiding or reducing use of the inline use of the IOMMU translation capabilities. ATS allows devices to support shared virtual memory, and support protocols such as coherent caches that operate in the physical address domain (such as Compute Express Link (CXL) cache, or CXL.cache). A Secure ATS service on the IOMMU 116 can enforce isolation of the physical addresses that a device can access using a physical-indexed table that contains permissions for each page. The table can be set up on a per-domain basis (e.g., for each virtual machine in a virtual environment or for each process in a non-virtual environment). Services such as a secure ATS can benefit from having access to a domain identifier for each message being processed. For example, a message trying to access a physical memory address included in the message may be permitted or not permitted based on the domain associated with the message and the physical memory address.

As such, an indicator of a domain may be included in messages sent on the link 119. One approach would be to include all the data needed to identify the domain in a header of each message of a link protocol. However, if the message size is small, increasing the header size with a domain identifier will reduce the efficiency of the link 119 significantly. The link efficiency is defined as the ratio between the size of the data being sent in the message and the size of the entire message. For example, if the domain identifier information is, e.g., 36 bits, and the size of previously used message is 512 bits, then the additional 36 bits in the header will increase the size of the entire message to 548 bits, leading to reduction in link efficiency of 7%, not including the impact of other control fields in the header such as physical address. If the size of the domain identifier in the header could be reduced the efficiency of the link could be improved up to 7 percentage points. In general, the payload may be any suitable length, such as 25 to 216 bits. The domain identifier information may be any suitable length, such as 12-64 bits.

When the additional header bits to be transmitted are mapped to a relatively small number of domains, e.g. not all possible combinations are likely to appear on the link 119, increasing link efficiency may be storing a mapping of the domains that are in use to a smaller number of header bits in a table (such as device handle table 600) on both ends of the link. In addition (or instead of) to storing a mapping of domains, a mapping of other header bits (such as device or domain capability) may be mapped to a smaller number of header bits.

In order to increase the efficiency of the link 119, in the illustrative embodiment, a device handle table 600 (see FIG. 6) may be defined that includes several entries for different device handle identifiers (DHIs). Each entry in the device handle table 600 includes a DHI and one or more elements of a domain identifier, such as a bus/device/function (BDF) identifier (or source identifier) and/or a processor address space identifier (PASID). In the illustrative embodiment, the BDF identifier is 16 bits and the PASID is 20 bits, giving a domain identifier that is 16-36 bits. More generally, the domain identifier is any identifier that identifies a virtual function, a virtual machine, a process, and/or any other suitable domain. In some embodiments, the domain identifier may be any identifier that identifies different memory domains, and the domain identifier can be used by the IOMMU 116, memory 110, controller hub 115, etc., to enforce boundaries between different memory domains. The domain identifier may be any suitable number of bits, such as 8-64 bits. The device handle table 600 may include additional fields that can be uniquely associated with a domain. For example, in some embodiments the device handle table 600 may include a Trusted bit for each DHI to identify if the DHI is for a trusted domain.

Rather than including the BDF identifier and/or the PASID in a message header, which would be 16-36 bits per message, messages across the link 119 may include a reference to an entry in the device handle table in the message header, which can be indexed using a smaller number of bits. For example, the device handle table can be indexed with, e.g., 2-12 bits, which would correspond to 4-4,096 entries in the device handle table. As more domains may exist than entries available in the device handle table 600, entries in the device handle table 600 can be allocated and deallocated as necessary. In the illustrative embodiment, the increased efficiency in the link 119 due to a smaller number of bits used to identify the domain makes up for any resources necessary to populate and maintain the device handle table 600.

The approach described herein allows a link (such as a PCIe or CXL link) to support any usages that require tagging of transactions with a sparse set of header fields more efficiently. In one embodiment, it allows fine-grained memory isolation (such as per virtual machine or per process) as defined by software (e.g., by a virtual machine manager (VMM), hypervisor, or an operating system). By splitting the tagging of the domain into a separate device identifier allocation message, a regular message can use a smaller tag to identify the relevant domain. Additionally, the techniques disclosed herein can be used to expand the device context information associated with a device handle identifier (DHI). For example, the device context information can include a trusted bit, which may be used for, e.g., Intel® trusted domain extensions for input/output (TDX.IO).

Figure 2:
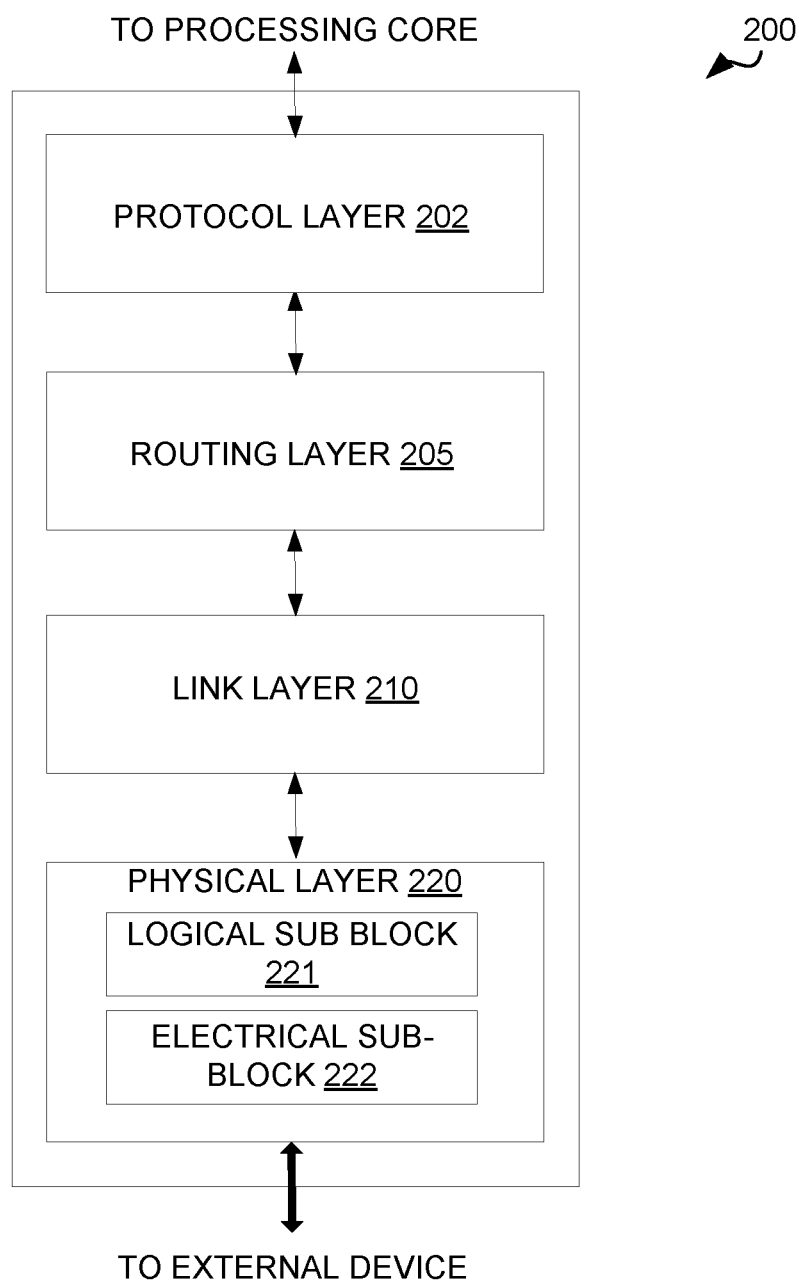
FIG. 2 illustrates an embodiment of an interconnect architecture including a layered stack.
Figure 3:
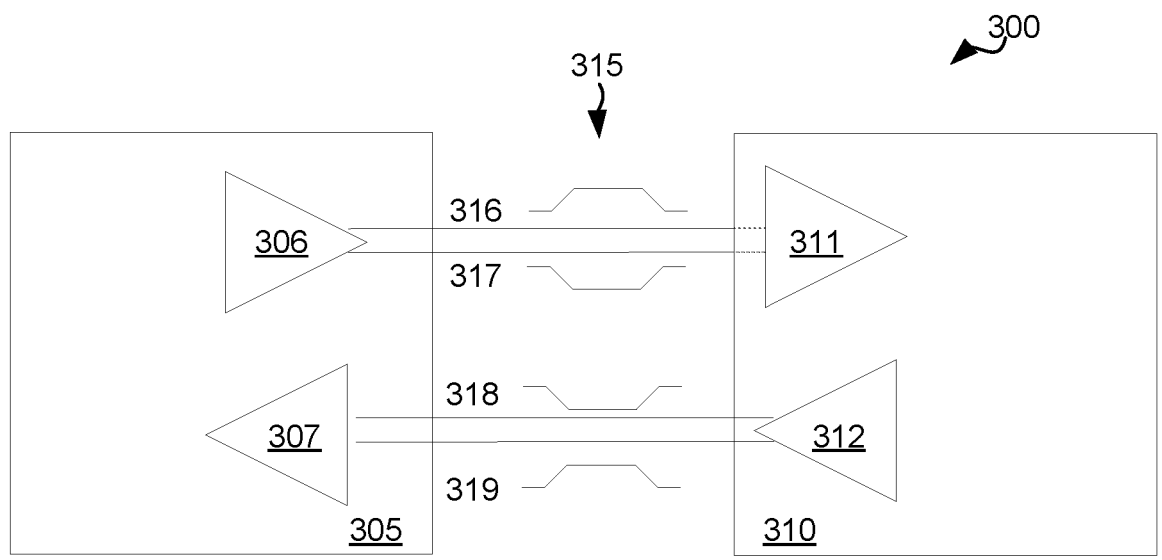
FIG. 3 illustrates an embodiment of a transmitter and receiver pair for an interconnect architecture.

Turning to FIG. 2 an embodiment of a layered protocol stack is illustrated. Layered protocol stack 200 includes any form of a layered communication stack, such as a Quick Path Interconnect (QPI) stack, an Ultra Path Interconnect (UPI) stack, a PCIe stack, a Compute Express Link (CXL), a next generation high performance computing interconnect stack, or other layered stack. Although the discussion immediately below in reference to FIGS. 1-3 are in relation to a UPI stack, the same concepts may be applied to other interconnect stacks. In one embodiment, protocol stack 200 is a UPI protocol stack including protocol layer 202, routing layer 205, link layer 210, and physical layer 220. An interface or link, such as link 109 in FIG. 1, may be represented as communication protocol stack 200. Representation as a communication protocol stack may also be referred to as a module or interface implementing/including a protocol stack.

UPI uses packets to communicate information between components. Packets are formed in the Protocol Layer 202 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally to the form that can be processed by the Protocol Layer 202 of the receiving device.

Protocol Layer

In one embodiment, protocol layer 202 is to provide an interface between a device's processing core and the interconnect architecture, such as data link layer 210 and physical layer 220. In this regard, a primary responsibility of the protocol layer 202 is the assembly and disassembly of packets. The packets may be categorized into different classes, such as home, snoop, data response, non-data response, non-coherent standard, and non-coherent bypass.

Routing Layer

The routing layer 205 may be used to determine the course that a packet will traverse across the available system interconnects. Routing tables may be defined by firmware and describe the possible paths that a packet can follow. In small configurations, such as a two-socket platform, the routing options are limited and the routing tables quite simple. For larger systems, the routing table options may be more complex, giving the flexibility of routing and rerouting traffic.

Link Layer

Link layer 210, also referred to as data link layer 210, acts as an intermediate stage between protocol layer 202 and the physical layer 220. In one embodiment, a responsibility of the data link layer 210 is providing a reliable mechanism for exchanging packets between two components. One side of the data link layer 210 accepts packets assembled by the protocol layer 202, applies an error detection code, i.e., CRC, and submits the modified packets to the physical layer 220 for transmission across a physical to an external device. In receiving packets, the data link layer 210 checks the CRC and, if an error is detected, instructs the transmitting device to resend. In the illustrative embodiment, CRC are performed at the flow control unit (flit) level rather than the packet level. In the illustrative embodiment, each flit is 80 bits. In other embodiments, each flit may be any suitable length, such as 16, 20, 32, 40, 64, 80, or 128 bits.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 220. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In the illustrative embodiment, the physical layer 220 sends and receives bits in groups of 20 bits, called a physical unit or phit. In some embodiments, a line coding, such as an 8b/10b transmission code or a 64b/66b transmission code, is employed. In some embodiments, special symbols are used to frame a packet with frames 223. In addition, in one example, the receiver also provides a symbol clock recovered from the incoming serial stream.

As stated above, although protocol layer 202, routing layer 205, link layer 210, and physical layer 220 are discussed in reference to a specific embodiment of a QPI protocol stack, a layered protocol stack is not so limited. In fact, any layered protocol may be included/implemented. As an example, a port/interface that is represented as a layered protocol includes: (1) a first layer to assemble packets, i.e. a protocol layer; a second layer to sequence packets, i.e. a link layer; and a third layer to transmit the packets, i.e. a physical layer. As a specific example, a common standard interface (CSI) layered protocol is utilized.

Referring next to FIG. 3, an embodiment of a UPI serial point-to-point link is illustrated. Although an embodiment of a UPI serial point-to-point link is illustrated, a serial point-to-point link is not so limited, as it includes any transmission path for transmitting serial data. In the embodiment shown, a basic UPI serial point-to-point link includes two, low-voltage, differentially driven signal pairs: a transmit pair 306/312 and a receive pair 311/307. Accordingly, device 305 includes transmission logic 306 to transmit data to device 310 and receiving logic 307 to receive data from device 310. In other words, two transmitting paths, i.e. paths 316 and 317, and two receiving paths, i.e. paths 318 and 319, are included in a UPI link.

A transmission path refers to any path for transmitting data, such as a transmission line, a copper line, an optical line, a wireless communication channel, an infrared communication link, or other communication path. A connection between two devices, such as device 305 and device 310, is referred to as a link, such as link 315. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 5, 8, 10, 12, 16, 20, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., UPI), while others (e.g., Displayport) may not and may even including only transmit or only receive pairs, among other examples. A link may refer to a one-way link (such as the link established by transmission logic 306 and receive logic 311) or may refer to a bi-directional link (such as the links established by transmission logic 306 and 312 and receive logic 307 and 311).

A differential pair refers to two transmission paths, such as lines 316 and 317, to transmit differential signals. As an example, when line 316 toggles from a low voltage level to a high voltage level, i.e. a rising edge, line 317 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 4:
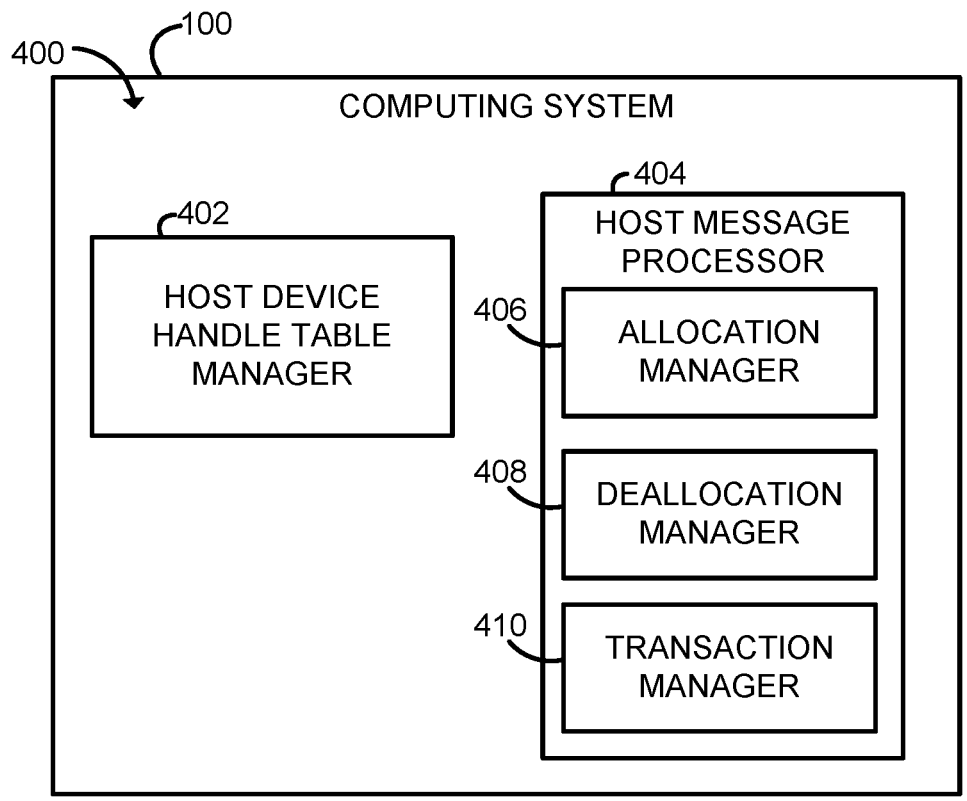
FIG. 4 illustrates a simplified block diagram of an environment that can be established by the computing system of FIG. 1.

Referring now to FIG. 4, in an illustrative embodiment, the computing system 100 establishes an environment 400 during operation. The illustrative environment 400 includes a host device handle table manager 402 and a host message processor 404. The various modules of the environment 400 may be embodied as hardware, software, firmware, or a combination thereof. For example, the various modules, logic, and other components of the environment 400 may form a portion of, or otherwise be established by, the controller hub 115 (which may be a root complex) the port 117 (which may be a root port), or other hardware components of the computing system 100. As such, in some embodiments, one or more of the modules of the environment 400 may be embodied as circuitry or collection of electrical devices (e.g., host device handle table manager circuitry 402, host message processor circuitry 404, etc.). It should be appreciated that, in such embodiments, one or more of the circuits (e.g., the host device handle table manager circuitry 402, the host message processor circuitry 404, etc.) may form a portion of one or more of the controller hub 115, the port 117, and/or other components of the computing system 100. Additionally, in some embodiments, one or more of the illustrative modules may form a portion of another module and/or one or more of the illustrative modules may be independent of one another. Further, in some embodiments, one or more of the modules of the environment 400 may be embodied as virtualized hardware components or emulated architecture. It should be appreciated that some of the functionality of one or more of the modules of the environment 400 may require a hardware implementation, in which case embodiments of modules which implement such functionality will be embodied at least partially as hardware.

The host device handle table manager 402, which may be implemented as hardware, firmware, software, and/or any suitable combination thereof, is configured to manage the host device handle table, such as the table 600 shown in FIG. 6. The host device table manager 402 can add, remove, invalidate, etc., entries in the table 600. In the illustrative embodiment, each entry in the table 600 has a device handle identifier (DHI), one or more domain identifiers (such as a PASID or BDF identifier), and, in some embodiments, additional context information such as a trusted bit or whether a particular feature or set of features is supported by a particular device 125 or device context. For example, in some embodiments, a device 125 may not support PASID. In such embodiments, the PASID in the table 600 may be zero, or a separate bit in the host device handle table entry may indicate that PASID is not supported. In the illustrative embodiment, the DHI is an N-bit number, such as a 2-12 bit number, and the DHI may be any value from 0 to $2^N-1$. Each entry in the table may have any suitable number of bits. For example, in the illustrative embodiment, each PASID is 20 bits, each BDF identifier is 16 bits, and the trusted bit is a single bit. More generally, each column in each entry in the table may have any suitable number of bits, such as 1-128 bits.

In some embodiments, the host device table manager 402 may store some or all of the table 600 on SRAM or may store some or all of the table 600 in private DRAM and use a cache to keep its most recently used entries. In the illustrative embodiment, the host device handle table manager 402 manages separate table 600 for each connected device 125. In some embodiments, the host device handle table manager 402 may manage a single table 600 for more than one or all of the connected devices 125. In such embodiments, the table 600 may be partitioned and each partition assigned to a unique connected device.

In some embodiments, the host device handle table manager 402 may receive an instruction to clear or reset a table. For example, in some embodiments, upon a hot swap or hot plug of a device 125, a table 600 associated with the device 125 may be reset or completely deallocated.

The host message processor 404, which may be implemented as hardware, firmware, software, and/or any suitable combination thereof, is configured to manage the host device handle table, is configured to manage messages sent to and from the controller hub 115. The host message processor 404 includes an allocation manager 406, a deallocation manager 408, and a transaction manager 410.

The allocation manager 406 is configured to process special-purpose device handle identifier (DHI) allocation messages. The device allocation message may indicate, e.g., a DHI to allocate (e.g., an n-bit number), a bus/device/function (BDF) identifier, a processor address space identifier (PASID), and a trusted bit value. Upon receipt of a device allocation message, the allocation manager 406 allocates the device handle identifier by adding or editing an entry in a device handle identifier table 600. The allocation manager 406 stores the context information included in the message (such as the BDF identifier, the PASID, the trusted bit, etc.). It should be appreciated that additional context may be provided other than the specific context described herein, such as context associated with protocols not explicitly referenced herein. In some embodiments, the allocation manager 406 may validate that the BDF is within the secondary and subordinate bus number of the controller hub 115. The allocation manager 406 may also validate that the DHI is within the DHI range associated with the BDF if the host device handle table 600 has been partitioned among connected devices.

The deallocation manager 408 is configured to process special-purpose DHI deallocation messages. A deallocation message indicates a DHI that should be deallocated. Upon receipt of a deallocation message, the deallocation manager 408 deallocates the DHI included in the DHI deallocation message. The deallocation manager 408 may, e.g., delete an entry from the device handle table 600 or mark an entry associated with the DHI as invalid. In some embodiments, the device deallocation message may indicate that all of the device handles should be deallocated. Such a message may, e.g., be initiated by software after a hot plug event. In response to such a message, the deallocation manager 408 may deallocate all device handles associated with one or more devices 125. In the illustrative embodiment, allocation and deallocation messages are sent from the device 125 on links 119 such as PCIe or CXL when the device is responsible for autonomously managing the DHI assigned to it. In some embodiments, software may use deallocation and/or allocation messages using MMIO register writes to manage the device handle table. The interface used to initiate those messages may be implementation specific. In one implementation, the controller hub 115 may use the Intel® Virtualization Technology for Directed I/O (Intel® VT-d) architecture to send these deallocation requests to the device 125 using a similar or the mechanisms used to send device translation lookaside buffer (DevTLB) address translation invalidation messages.

The transaction manager 410 is configured to process ordinary transaction messages on the link 119 connecting a device 125 and the controlled hub 115. In the illustrative embodiment, transaction messages received from the device 125 include a DHI, and messages to be sent to the device 125 include a DHI. Upon receipt of a message, the transaction manager 410 accesses the entry in the device handle table corresponding to the DHI or domain identifier in the message. If the entry is not valid or not in the table, processing of the message is aborted and an error may be returned.

For messages received from the device 125, the transaction manager 410 processes the transaction message with use of the domain identifier fields retrieved from a valid entry the host device handle table corresponding to the DHI in the message. In one embodiment, the transaction manager 410 may send the transaction message to a destination, such as the IOMMU 116, the memory 110, the processor 105, etc. Additionally or alternatively, the transaction manager 410 may use the domain identifier to determine how to process the message. For example, in one embodiment, security validation of the access using Secure ATS will use this BDF identifier and PASID to determine if the access is permitted. For messages to be sent to the device 125, the transaction manager 410 may send the message to the device 125 with the DHI from the device handle table. The device 125 can then use the DHI to identify the domain and process the message accordingly. In some embodiments, an entry in the device handle table 600 may indicate whether a particular function or feature is supported. For example, for Secure ATS, if the PASID field was not valid, the transaction manager 410 may use a Requester ID PASID (RID PASID), which may be defined by Intel® VT-d, in place of the PASID to perform a Secure ATS check. As another example, the trusted field may be used to treat the message as a trusted transaction as defined by Intel® VT-d, and if the trusted field is not valid for a domain, all requests associated with the domain would be treated as untrusted.

Figure 5:
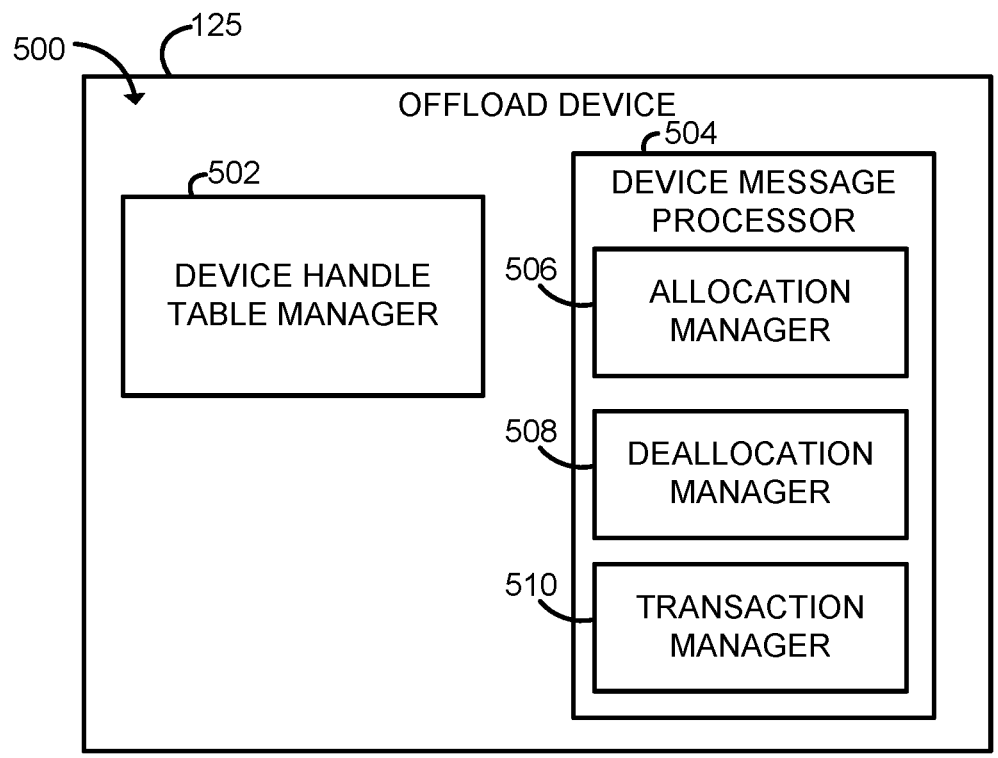
FIG. 5 illustrates a simplified block diagram of an environment that can be established by an input/output device of the computing system of FIG. 1.

Referring now to FIG. 5, in an illustrative embodiment, the offload device 125 establishes an environment 500 during operation. The illustrative environment 500 includes a device handle table manager 502 and a device message processor 504. The various modules of the environment 500 may be embodied as hardware, software, firmware, or a combination thereof. For example, the various modules, logic, and other components of the environment 500 may form a portion of, or otherwise be established by, the device 125 or other hardware components of the computing system 100. As such, in some embodiments, one or more of the modules of the environment 500 may be embodied as circuitry or collection of electrical devices (e.g., device handle table manager circuitry 502, device message processor circuitry 504, etc.). It should be appreciated that, in such embodiments, one or more of the circuits (e.g., the device handle table manager circuitry 502, the device message processor circuitry 504, etc.) may form a portion of the device 125 and/or other components of the computing system 100. Additionally, in some embodiments, one or more of the illustrative modules may form a portion of another module and/or one or more of the illustrative modules may be independent of one another. Further, in some embodiments, one or more of the modules of the environment 500 may be embodied as virtualized hardware components or emulated architecture. It should be appreciated that some of the functionality of one or more of the modules of the environment 500 may require a hardware implementation, in which case embodiments of modules which implement such functionality will be embodied at least partially as hardware.

The device handle table manager 502, which may be implemented as hardware, firmware, software, and/or any suitable combination thereof, is configured to manage the device handle table 600 on the device 125, such as the table 600 shown in FIG. 6. The device table manager 502 can add, remove, invalidate, etc., entries in the table 600. In some embodiments, the device table manager 502 may store some or all of the table 600 on SRAM or may store some or all of the table 600 in private DRAM and use a cache to keep its most recently used entries. In some embodiments, the device handle table manager 502 may receive an instruction to clear or reset a table. For example, in some embodiments, upon a hot swap or hot plug of a device 125, a table 600 associated with the device 125 may be reset or completely deallocated.

The device message processor 504, which may be implemented as hardware, firmware, software, and/or any suitable combination thereof, is configured to control device handle table allocations and deallocations on the device 125 and to use the device handle table information when sending ordinary transactions on the link 119. The device message processor 504 includes an allocation manager 506, a deallocation manager 508, and a transaction manager 510.

The allocation manager 506 manages device handle allocations on the device 125. When a DHI needs to be allocated, the allocation manager communicates with the device handle manager 502 to allocate an entry in the device handle table 600. In one embodiment, allocation of DHI may be performed by software by writing to MMIO registers on the device. In such case, software would also be responsible for sending a DHI allocation message to the host allocation manager 406. In another embodiment, the device 125 selects a DHI to be allocated autonomously among those DHI assigned to the device, using a device-specific selection method using any suitable algorithm to select the DHI, such as a first-in-first-out algorithm, a least recently used algorithm, a least frequently used algorithm, etc. In such case, the allocation manager 506 is responsible for sending a DHI allocation message to the computing system 100 on the link 119, only after the update to the local device handle table 600 is completed. If no DHI is free, software or the device is expected to first deallocate an existing DHI using the deallocation manager 508. In one embodiment, DHI allocation occurs when a new device context is created by software. When software creates a device context, it is required to provide the necessary information to identify the device context domain, such as the BDF and/or PASID information, using a device-specific mechanism.

The deallocation manager 508 manages device handle deallocation on the device 125. When a DHI needs to be deallocated, the deallocation manager communicates with the device handle manager 502 to deallocate an entry in the device handle table 600. In one embodiment, deallocation of DHI may be performed by software by writing to MMIO registers on the device. In such case, software would also be responsible for sending a DHI deallocation message to the host deallocation manager 408. In another embodiment, the device 125 selects a DHI to be deallocated autonomously, using a device-specific selection method. In such case, the deallocation manager 508 is responsible for sending a DHI deallocation message to the computing system 100 on the link 119, only after the update to the local device handle table 600 is completed. In one embodiment, DHI deallocation occurs when a device context is terminated by software.

In the illustrative embodiment, the deallocation manager 508 must ensure that all previous requests using a particular DHI have been completed before deallocating the DHI. If necessary, the deallocation manager 508 may wait until all previous requests associated with a DHI have been completed before deallocating a DHI. In some embodiments, the deallocation manager 508 may select a DHI to deallocate based on the DHI not having any outstanding requests.

In some embodiments, a device handle allocation message automatically deallocates the DHI from the previous domain and reallocates it to the new domain on the device 125 and/or the controller hub 115. In such embodiments, an explicit device handle deallocation message may not be necessary. In some embodiments, the deallocation manager 508 may receive a message to deallocate one or more or all of the device handles, such as from software operating on another component of the computing system 100. In such cases, the deallocation manager 508 may update the device handle table accordingly.

The transaction manager 510 is configured to process ordinary transaction on the device 125. For messages sent from the device 125, the transaction manager 510 may access the device handle table to identify the device handle identifier (DHI) for the domain associated with the message. The transaction manager 510 then sends the message with the DHI. It should be appreciated that the transaction manager 510 does not need to include the domain identifier, which would be longer (i.e., more bits) than the DHI.

For messages received at the device 125 from the controller hub 115 with a DHI, the transaction manager 510 accesses an entry in the device handle table based on the DHI. In the illustrative embodiment, the transaction manager 510 searches the device handle table for an entry that matches the DHI. The transaction manager 510 accesses the domain identifier corresponding to the DHI. The transaction manager 510 then processes the message based on the domain identifier. For example, the transaction manager 510 may send the message to a particular virtual function, a queue pair, a dedicated work queue, a shared work queue, a work command, etc. In the illustrative embodiment, the domain identifier may be a BDF identifier and/or a PASID. In some embodiments, if the transaction manager 510 does not find an entry in the device handle table based on the DHI, the transaction manager 510 may send an error message.

Referring now to FIG. 6, in one embodiment, a device handle table 600 includes several entries for different device handle identifiers (DHIs). Each illustrative entry includes a DHI, a PASID, a BDF identifier, and a trusted bit. A valid bit on each entry indicates if a valid DHI has been allocated in the entry. Additionally or alternatively, a column in the table 600 may indicate whether a particular feature is supported.

It should be appreciated that the device handle table 600 may be organized differently on the controller hub 115 from the device 125. For example, the table 600 on the controller hub 115 may be indexed differently from the device 125. In another example, the device 125 may include an indication of a queue pair, a dedicated work queue, a shared work queue, a work command, etc., associated with a DHI. The device handle table 600 may be of different size on the controller hub 115 and the device 125. For example, if the device handle table 600 on the controlled hub 115 is partitioned among the connected devices, each connected device 125 only needs to store the subset of DHI assigned to it. In one embodiment, software partitions the DHI by assigning a contiguous range of DHI to each device 125.

Figure 7:
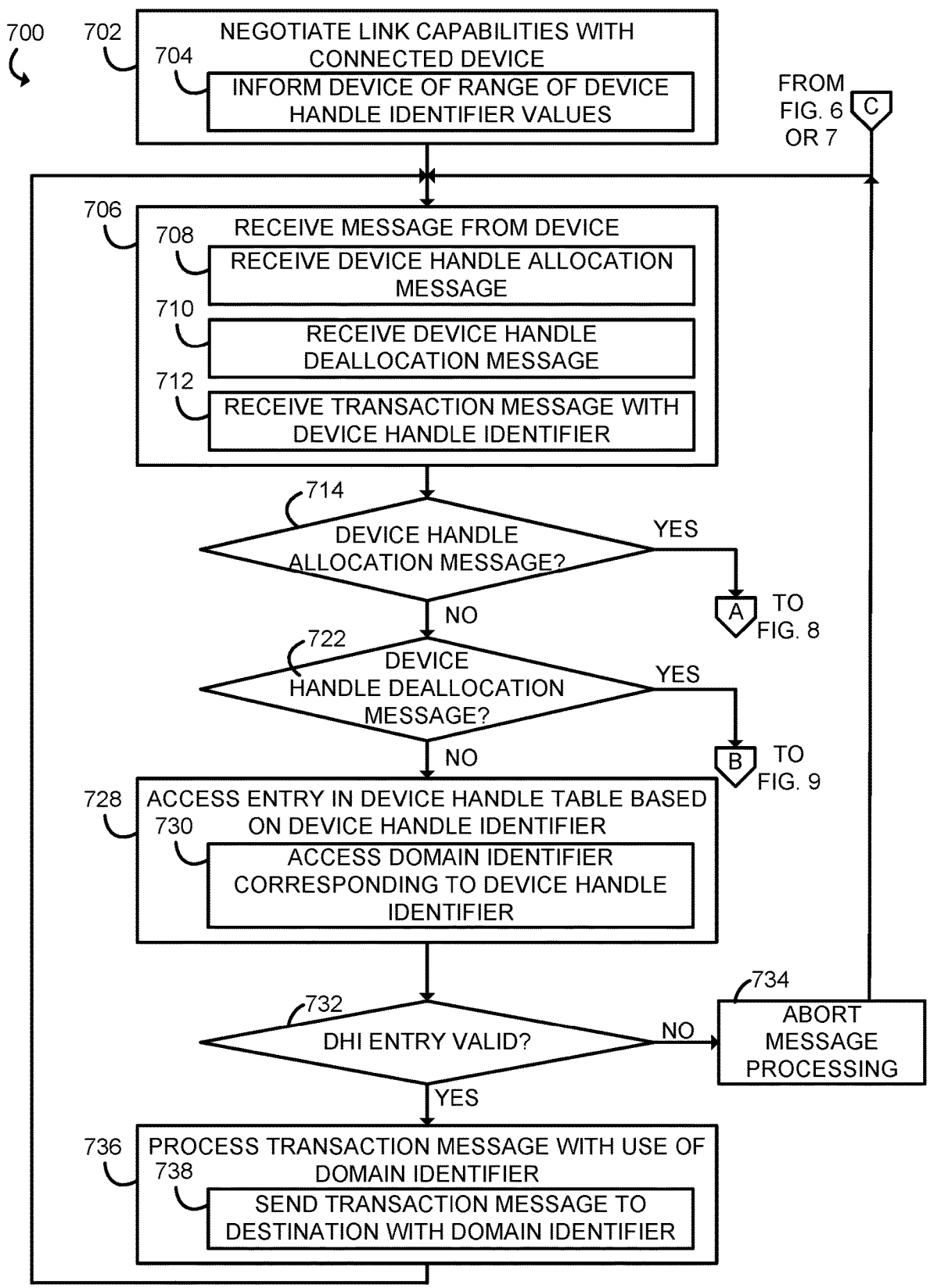
FIGS. 7-9 illustrate a simplified flow diagram of at least one embodiment of a method for transferring data using device handle identifiers that may be performed by the computing system of FIG. 1.

Referring now to FIG. 7, in use, the computing system 100 may execute a method 700 for transferring data using device handle identifiers (DHIs), which may be performed by hardware, software, firmware, or any combination thereof. In the illustrative embodiment, some or all of the method 700 may be performed by the controller hub 115. In some embodiments, the controller hub 115 may be a root complex, and some or all of the method 700 may be performed by a root port 117. The method 700 begins in block 702, in which the controller hub 115 negotiates link capabilities with one or more connected devices 125. In the illustrative embodiment, the controller hub 115 negotiates link capabilities when the link is first established. For example, the controller hub 115 may send and/or receive a message with an enabling bit at a particular location indicating that the controller hub 115 and/or the connected device 125 supports using DHIs. In the illustrative embodiment, the controller hub 115 informs the device 125 of the allowed range of DHI values in block 704. For example, if the DHIs are stored in the controller hub as N bits, then the DHI values can be from 0 to $2^N-1$. If the device handle table 600 is being partitioned among multiple devices, the controlled hub informs the device 115 of the range of DHIs assigned to it by providing the lower and upper bound value in the range from 0 to $2^N-1$.

In block 706, the controller hub 115 receives a message from the device 125. The message may be part of a coherent protocol such as CXL.cache or a non-coherent protocol such as CXL input/output (CXL.io). In some embodiments, the message may be referred to as a flit. The controller hub 115 may receive a device handle allocation (DHI ALLOC) message in block 708. The controller hub 115 may receive a device handle deallocation (DHI DEALLOC) message in block 710. In block 712, the controller hub 115 may receive a transaction message (e.g., a memory read or write, a cache coherency message, etc.) with a DHI. The message may be, e.g., a message associated with a queue pair, a dedicated work queue, a shared work queue, a work command, etc. In the illustrative embodiment, some or all of the messages in block 706 may be received from a device 125. It should be appreciated that, in some embodiments, devices 125 do not perform allocation and deallocation of DHIs, and, instead, the controller hub 115 receives the device handle allocation and device handle deallocation messages from software, such as, for example, through writes to memory mapped I/O (MMIO) registers. In that case, the controller hub 115 processes these messages in the same manner as if they came from the device.

Figure 8:
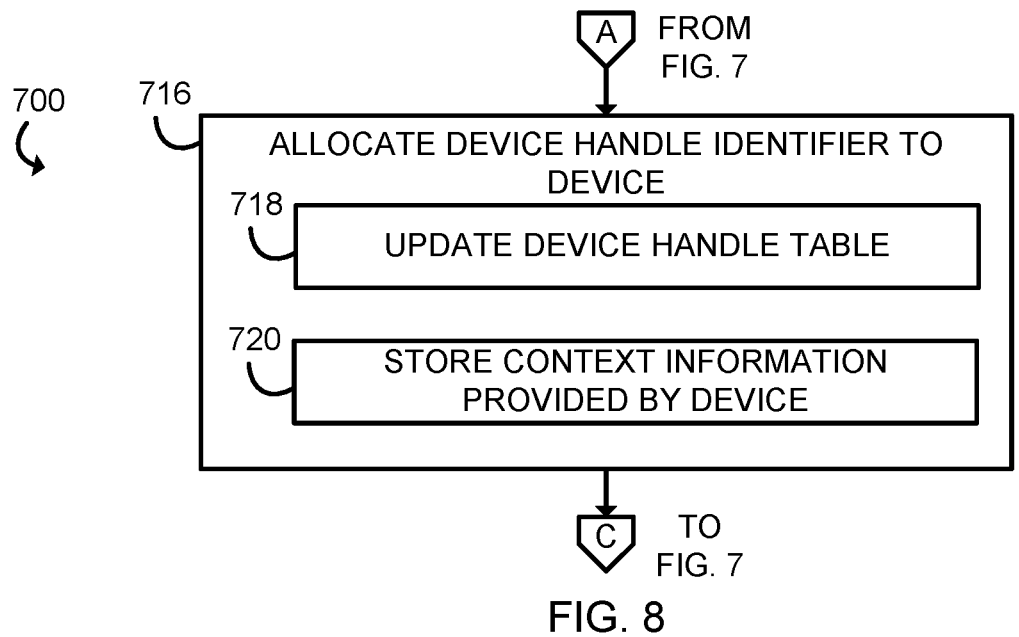
Figure 9:
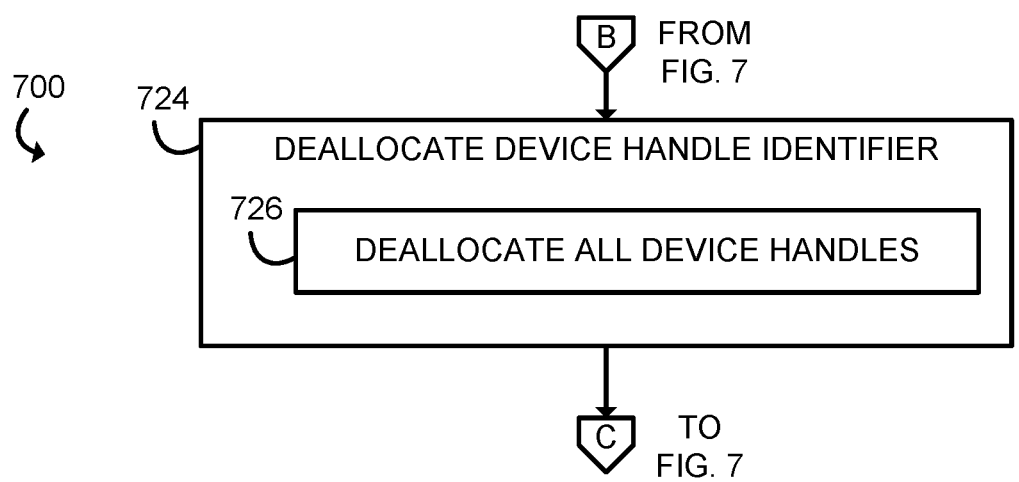

In block 714, if the message is a device allocation message, the method 700 jumps to block 716 in FIG. 8. In block 716, the controller hub 115 allocates a DHI to the device 125 based on the device allocation message. The device allocation message may indicate, e.g., a DHI to allocate (e.g., an n-bit number), a bus/device/function (BDF) identifier, a processor address space identifier (PASID), and a trusted bit value. In some embodiments, the controller hub 115 may validate that the BDF is within the secondary and subordinate number of the controller hub 115. The controller hub 115 may also validate that the DHI is within the DHI range associated with the BDF. The controller hub 115 updates the device handle table (such as device handle table 600) to add an entry (or mark the entry for the DHI as valid) in block 718. The controller hub 115 stores the context information provided by the device 125 (such as the BDF identifier, the PASID, the trusted bit, etc.) in block 720. It should be appreciated that additional context may be provided other than the specific context described herein, such as context associated with protocols not explicitly referenced herein. After the controller hub 115 stores the context information, the method 700 loops back to block 706 in FIG. 7 to wait for another message.

Referring back to block 714, if the received message is not a device handle allocation message, the method 700 proceeds to block 722. In block 722, if the message is a device deallocation message, the method 700 jumps to block 724 in FIG. 8. In block 724, the controller hub 115 deallocates the DHI in the device deallocation message. The controller hub 115 may, e.g., delete an entry from the device handle table 600 or mark an entry associated with the DHI as invalid. In some embodiments, the device deallocation message may indicate that all of the device handles should be deallocated. Such a message may, e.g., be initiated by software after a hot plug event. In response to such a message, the controller hub 115 may deallocate all device handles in block 726. More generally, software may send a message to deallocate, one, some, or all device handles. The method 700 then loops back to block 706 in FIG. 7 to wait for another message.

Referring back to block 722, if the received message is not a device handle deallocation message, the method 700 proceeds to block 728. In block 728, the controller hub 115 accesses the entry in the device handle table for the device 125 corresponding to the DHI in the message. As part of accessing the entry, the controller hub 115 accesses one or more domain identifiers corresponding to the DHI in block 730. The domain identifier may identify a virtual function, a virtual machine, a process, etc. In the illustrative embodiment, the domain identifier is embodied as a BDF identifier and/or PASID.

In block 732, if the entry for the DHI is not valid or not in the table, the method 700 proceeds to block 734, in which processing of the message is aborted and an error may be returned to the device 125. If the entry for the DHI is valid, the method 700 proceeds to block 736, in which the controller hub 115 processes the transaction message with use of the domain identifier. In one embodiment, the controller hub 115 may send the transaction message to a destination, such as the IOMMU 116, the memory 110, the processor 105, etc., in block 738. Additionally or alternatively, the controller hub 115 may use the domain identifier to determine how to process the message. For example, in one embodiment, security validation of the access using Secure ATS will use this BDF identifier and PASID to determine if the access is permitted.

Figure 10:
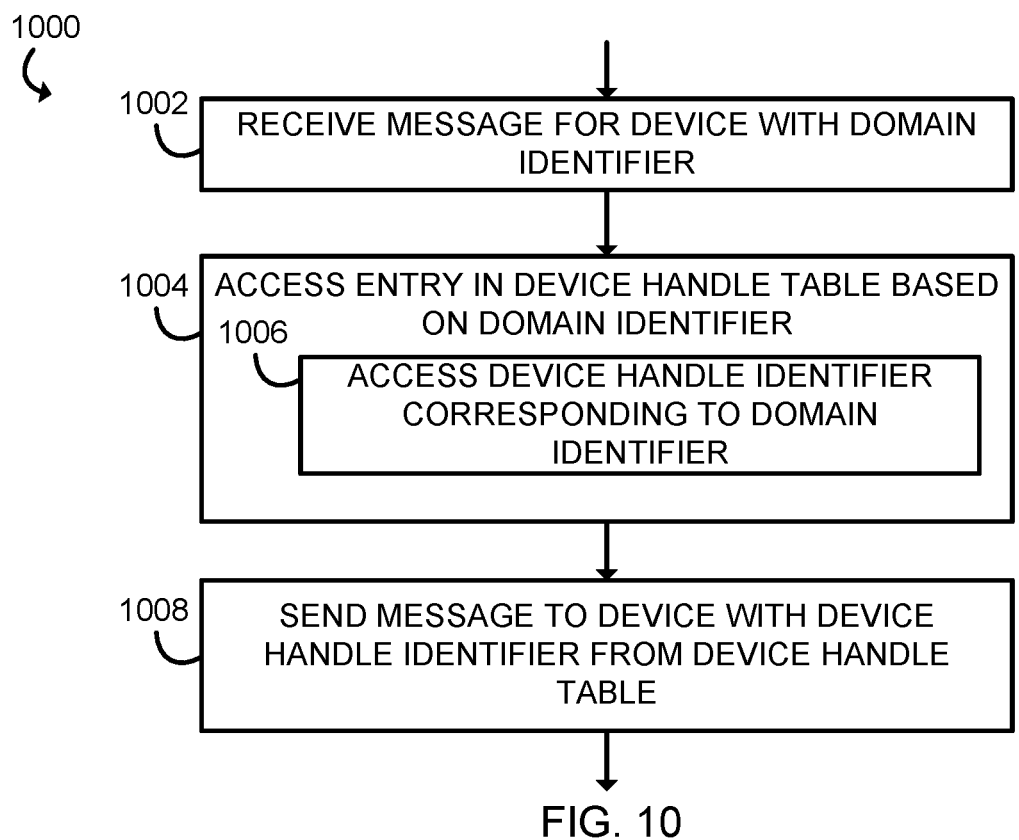
FIG. 10 illustrates a simplified flow diagram of at least one embodiment of a method for transferring data using device handle identifiers that may be performed by the computing system of FIG. 1.

Referring now to FIG. 10, in use, the computing system 100 may execute a method 1000 for transferring data using device handle identifiers (DHIs), which may be performed by hardware, software, firmware, or any combination thereof. In the illustrative embodiment, some or all of the method 1000 may be performed by the controller hub 115. In some embodiments, the controller hub 115 may be a root complex, and some or all of the method 1000 may be performed by a root port 117. The method 1000 begins in block 1002, in which the controller hub 115 receives a message for a device 125 with a domain identifier. In the illustrative embodiment, the domain identifier is a BDF identifier and/or a PASID. Additionally or alternatively, in some embodiments, the domain identifier may be any identifier that identifies a virtual function, a virtual machine, a process, etc. The message may be part of a coherent protocol such as CXL.cache or a non-coherent protocol such as CXL input/output (CXL.io). In some embodiments, the message may be referred to as a flit. The message may be, e.g., a memory read or write, a cache coherency message, etc. In some embodiments, the controller hub 115 may create a message to be sent to a device 125 and identify a domain identifier associated with the message.

In block 1004, the controller hub 115 accesses an entry in the device handle table based on the domain identifier. In the illustrative embodiment, the controller hub 115 searches the device handle table for an entry that matches the domain identifier, such as an entry that matches the BDF and/or PASID. In block 1006, the controller hub 115 accesses the DHI corresponding to the domain. In some embodiments, if the controller hub 115 does not find an entry in the device handle table based on the domain identifier, the controller hub 115 may send an error message and/or send a message to the device 125 using the domain identifier directly.

In block 1008, the controller hub 115 sends the message to the device 125 with the DHI from the device handle table. The device 125 can then use the DHI to identify the domain and process the message accordingly.

Figure 11:
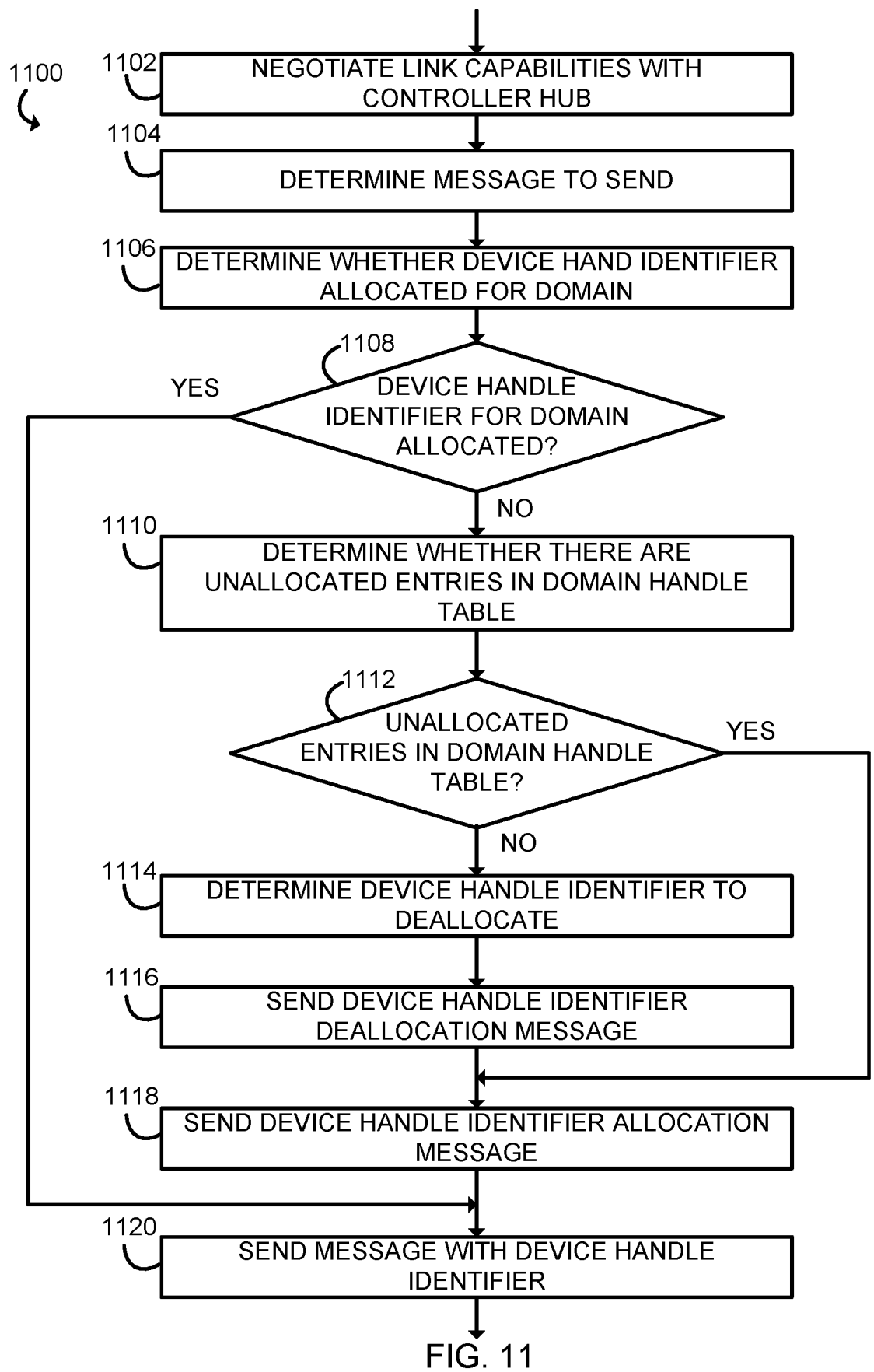
FIG. 11 illustrates a simplified flow diagram of at least one embodiment of a method for transferring data using device handle identifiers that may be performed by the computing system of FIG. 1.

Referring now to FIG. 11, in use, the computing system 100 may execute a method 1100 for transferring data using DHIs, which may be performed by hardware, software, firmware, or any combination thereof. In the illustrative embodiment, some or all of the method 1100 may be performed by a device 125. The method 1100 begins in block 1102, in which the device 125 negotiates link capabilities with the controller hub 115. In the illustrative embodiment, the device 125 negotiates link capabilities when the link is first established. For example, the device 125 may send and/or receive a message with an enabling bit at a particular location indicating that the controller hub 115 and/or the connected device 125 supports using DHIs. In the illustrative embodiment, the controller hub 115 informs the device 125 of the allowed range of DHI values. For example, if the DHIs are stored in the controller hub as N bits, then the DHI range assigned to the device 125 can be from 0 to $2^N-1$. In some embodiments, the device 125 implements a new capability to support use of DHIs using, for example, a Designated Vendor-Specific Extended Capability (DVSEC).

In block 1104, the device 125 determines a message to send. In one embodiment, a virtual function or other function on the device 125 creates a message to be sent and transmits it to a supervisor. As part of determining the message to send, the device 125 determines a domain associated with the message. For example, the device 125 may determine a domain identifier, such as a BDF identifier (or source ID) and/or a PASID associated with the message based on the device context that originated the message. In some embodiments, the device 125 may determine a device context as part of the domain identifier, such as a queue pair, a dedicated work queue, a shared work queue, a work command, etc. The message may be part of a coherent protocol such as CXL.cache or a non-coherent protocol such as CXL input/output (CXL.io). In some embodiments, the message may be referred to as a flit. The message may be, e.g., a memory read or write, a cache coherency message, etc.

In block 1106, the device 125 determines whether a DHI is allocated for the domain associated with the message. The device 125 may access a device handle table (such as by searching the device handle table for the domain identifier) and, if there is an entry associated with the domain, access the DHI.

In block 1108, if a DHI is allocated for the domain, the method 1100 jumps to block 1118, in which the device 125 sends a message with the DHI in a header of the message. The device 125 may send the message to the controller hub 115, possibly through one or more switches 120.

In block 1108, if a DHI is not allocated for the domain, the method 1100 proceeds to block 1110, in which the device 125 determines whether there are unallocated entries in the domain handle table. If there are, the method 1100 jumps to block 1120 to send a DHI allocation message. If there are not, the method 1100 proceeds to block 1114 to determine a DHI to deallocate.

In block 1114, the device 125 determines a DHI to deallocate. The device 125 may use any suitable approach to determining a DHI to deallocate. In some embodiments, a device context associated with a DHI has been terminated, but the associated DHI has not yet been deallocated, as the device 125 can deallocate DHIs lazily because there will be no new requests with the DHI until it gets reallocated. In such embodiments, the device 125 may deallocate a DHI for which the associated device context has been terminated. More generally, the device 125 may use any suitable algorithm to select the DHI, such as a first-in-first-out algorithm, a least recently used algorithm, a least frequently used algorithm, etc.

In the illustrative embodiment, the device 125 must ensure that all previous requests using a particular DHI have been completed before deallocating the DHI. If necessary, the device 125 may wait until all previous requests associated with a DHI have been completed before deallocating a DHI. In some embodiments, the device 125 may select a DHI to deallocate based on the DHI not having any outstanding requests.

In block 1116, the device 125 sends a DHI deallocation message to the controller hub 115 identifying the DHI to be deallocated. The device 125 will also update the local device handle table with an indication that the DHI has been deallocated. In some embodiments, a device handle allocation message automatically deallocates the DHI from the previous domain and reallocates it to the new domain on the device 125 and/or the controller hub 115. In such embodiments, an explicit device handle deallocation message may not be necessary.

In block 1118, the device 125 sends a device handle allocation message to the controller hub 115. The device handle allocation message may include a domain identifier and the DHI to be allocated. The domain identifier in the message includes the context information (such as the BDF identifier, the PASID, the trusted bit, etc.). The device 125 also updates the local device handle allocation table upon sending the DHI allocation message.

In block 1120, the device 125 sends the message with the DHI. It should be appreciated that the device 125 does not need to include the domain identifier, which would be longer (i.e., more bits) than the DHI.

Figure 12:
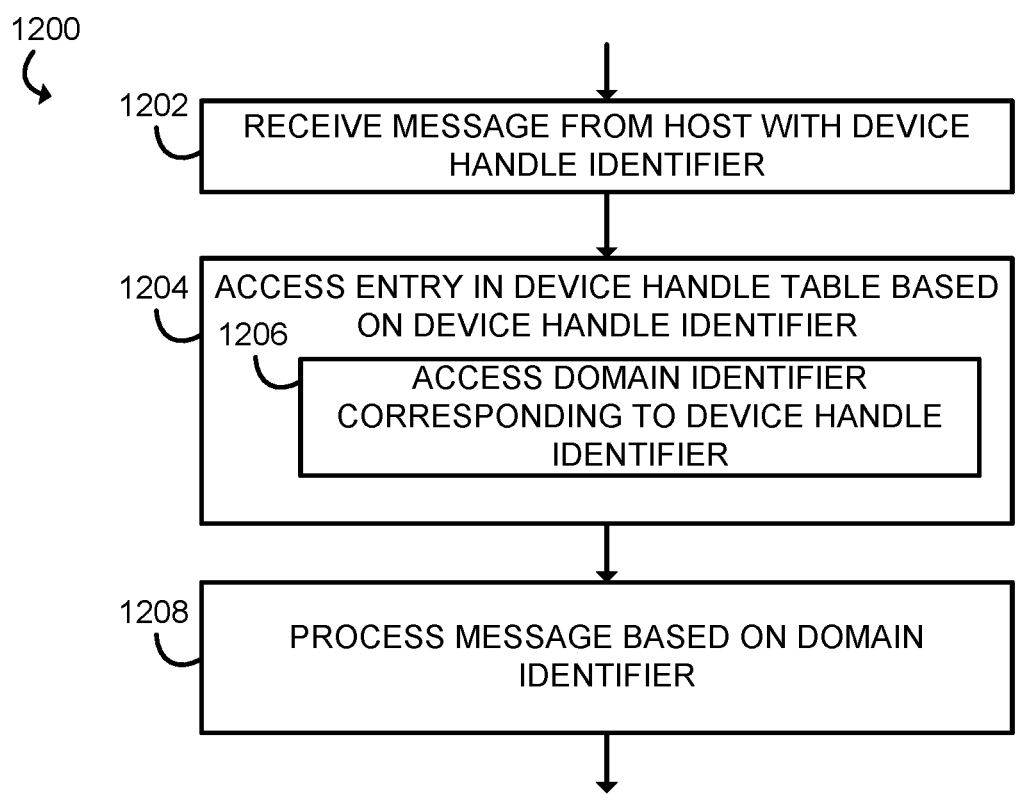
FIG. 12 illustrates a simplified flow diagram of at least one embodiment of a method for transferring data using device handle identifiers that may be performed by the computing system of FIG. 1.

Referring now to FIG. 12, in use, the computing system 100 may execute a method 1000 for transferring data using DHIs, which may be performed by hardware, software, firmware, or any combination thereof. In the illustrative embodiment, some or all of the method 1200 may be performed by the device 125. The method 1200 begins in block 1202, in which the device 125 receives a message from the host controller hub 115 with a DHI. The message may be part of a coherent protocol such as CXL.cache or a non-coherent protocol such as CXL input/output (CXL.io). In some embodiments, the message may be referred to as a flit. The message may be, e.g., a memory read or write, a cache coherency message, etc.

In block 1204, the device 125 accesses an entry in the device handle table based on the DHI. In the illustrative embodiment, the device 125 searches the device handle table for an entry that matches the DHI. In block 1206, the device 125 accesses the domain identifier corresponding to the DHI. In the illustrative embodiment, the domain identifier may be a BDF identifier and/or a PASID. In some embodiments, if the device 125 does not find an entry in the device handle table based on the domain identifier, the device 125 may send an error message.

In block 1208, the device 125 processes the message based on the domain identifier. For example, the device 125 may send the message to a particular virtual function, a queue pair, a dedicated work queue, a shared work queue, a work command, etc.

Figure 13:
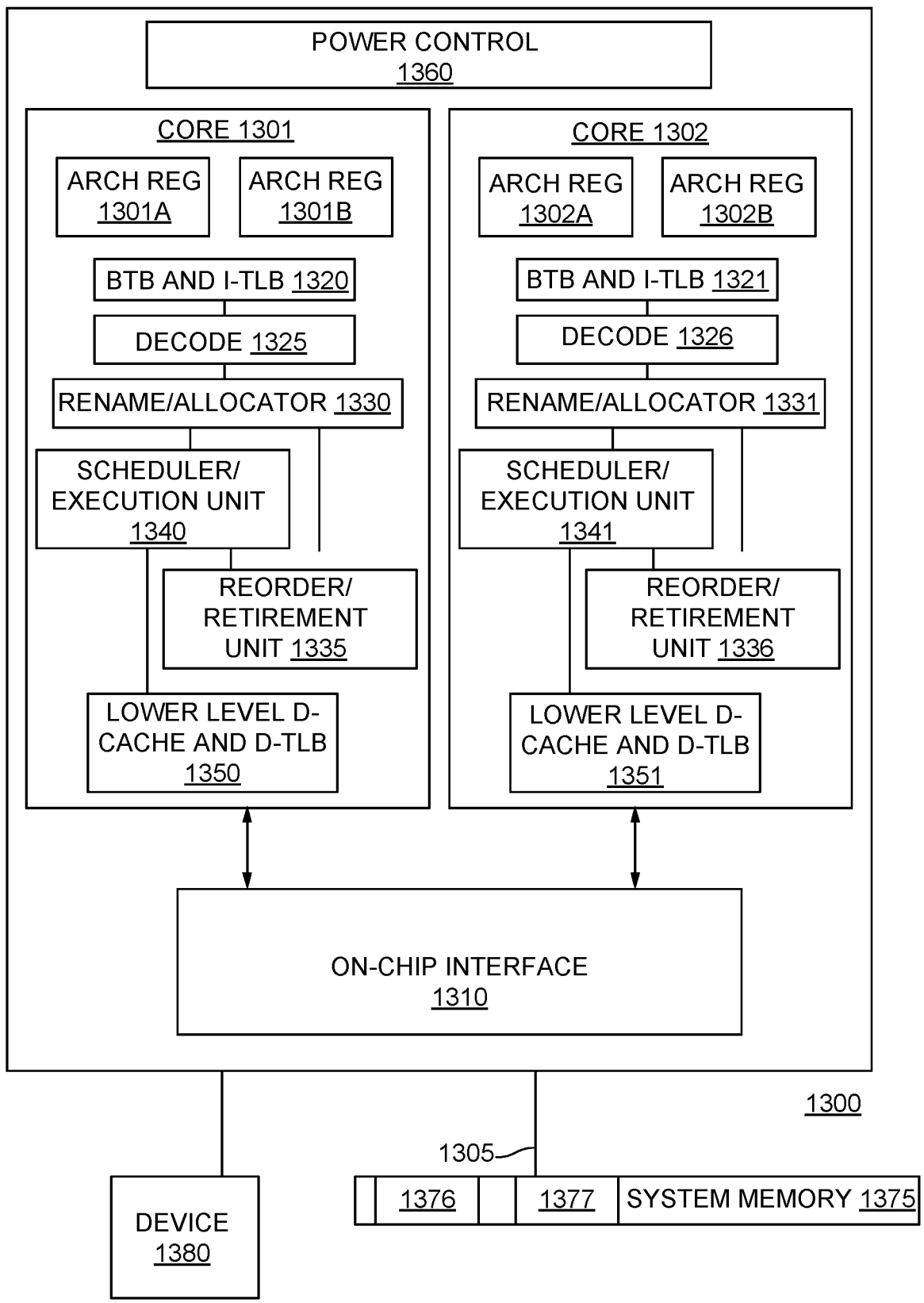
FIG. 13 illustrates an embodiment of a block diagram for a computing system including a multicore processor.

Referring to FIG. 13, an embodiment of a block diagram for a computing system including a multicore processor is depicted. Processor 1300 includes any processor or processing device, such as a microprocessor, an embedded processor, a digital signal processor (DSP), a network processor, a handheld processor, an application processor, a co-processor, a system on a chip (SOC), or other device to execute code. Processor 1300, in one embodiment, includes at least two cores—core 1301 and 1302, which may include asymmetric cores or symmetric cores (the illustrated embodiment). However, processor 1300 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1300, as illustrated in FIG. 13, includes two cores—core 1301 and 1302. Here, core 1301 and 1302 are considered symmetric cores, i.e. cores with the same configurations, functional units, and/or logic. In another embodiment, core 1301 includes an out-of-order processor core, while core 1302 includes an in-order processor core. However, cores 1301 and 1302 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1301 are described in further detail below, as the units in core 1302 operate in a similar manner in the depicted embodiment.

As depicted, core 1301 includes two hardware threads 1301*a* and 1301*b*, which may also be referred to as hardware thread slots 1301*a* and 1301*b*. Therefore, software entities, such as an operating system, in one embodiment potentially view processor 1300 as four separate processors, i.e., four logical processors or processing elements capable of executing four software threads concurrently. As alluded to above, a first thread is associated with architecture state registers 1301*a*, a second thread is associated with architecture state registers 1301*b*, a third thread may be associated with architecture state registers 1302*a*, and a fourth thread may be associated with architecture state registers 1302*b*. Here, each of the architecture state registers (1301*a*, 1301*b*, 1302*a*, and 1302*b*) may be referred to as processing elements, thread slots, or thread units, as described above. As illustrated, architecture state registers 1301*a* are replicated in architecture state registers 1301*b*, so individual architecture states/contexts are capable of being stored for logical processor 1301*a* and logical processor 1301*b*. In core 1301, other smaller resources, such as instruction pointers and renaming logic in allocator and renamer block 1330 may also be replicated for threads 1301*a* and 1301*b*. Some resources, such as re-order buffers in reorder/retirement unit 1335, ILTB 1320, load/store buffers, and queues may be shared through partitioning. Other resources, such as general purpose internal registers, page-table base register(s), low-level data-cache and data-TLB 1315, execution unit(s) 1340, and portions of out-of-order unit 1335 are potentially fully shared.

Processor 1300 often includes other resources, which may be fully shared, shared through partitioning, or dedicated by/to processing elements. In FIG. 13, an embodiment of a purely exemplary processor with illustrative logical units/resources of a processor is illustrated. Note that a processor may include, or omit, any of these functional units, as well as include any other known functional units, logic, or firmware not depicted. As illustrated, core 1301 includes a simplified, representative out-of-order (OOO) processor core. But an in-order processor may be utilized in different embodiments. The OOO core includes a branch target buffer 1320 to predict branches to be executed/taken and an instruction-translation buffer (I-TLB) 1320 to store address translation entries for instructions.

Core 1301 further includes decode module 1325 coupled to fetch unit 1320 to decode fetched elements. Fetch logic, in one embodiment, includes individual sequencers associated with thread slots 1301a, 1301b, respectively. Usually core 1301 is associated with a first ISA, which defines/specifies instructions executable on processor 1300. Often machine code instructions that are part of the first ISA include a portion of the instruction (referred to as an opcode), which references/specifies an instruction or operation to be performed. Decode logic 1325 includes circuitry that recognizes these instructions from their opcodes and passes the decoded instructions on in the pipeline for processing as defined by the first ISA. For example, as discussed in more detail below decoders 1325, in one embodiment, include logic designed or adapted to recognize specific instructions, such as transactional instruction. As a result of the recognition by decoders 1325, the architecture or core 1301 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1326, in one embodiment, recognize the same ISA (or a subset thereof). Alternatively, in a heterogeneous core environment, decoders 1326 recognize a second ISA (either a subset of the first ISA or a distinct ISA).

In one example, allocator and renamer block 1330 includes an allocator to reserve resources, such as register files to store instruction processing results. However, threads 1301a and 1301b are potentially capable of out-of-order execution, where allocator and renamer block 1330 also reserves other resources, such as reorder buffers to track instruction results. Unit 1330 may also include a register renamer to rename program/instruction reference registers to other registers internal to processor 1300. Reorder/retirement unit 1335 includes components, such as the reorder buffers mentioned above, load buffers, and store buffers, to support out-of-order execution and later in-order retirement of instructions executed out-of-order.

Scheduler and execution unit(s) block 1340, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1350 are coupled to execution unit(s) 1340. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1301 and 1302 share access to higher-level or further-out cache, such as a second level cache associated with on-chip interface 1310. Note that higher-level or further-out refers to cache levels increasing or getting further way from the execution unit(s). In one embodiment, higher-level cache is a last-level data cache—last cache in the memory hierarchy on processor 1300—such as a second or third level data cache. However, higher level cache is not so limited, as it may be associated with or include an instruction cache. A trace cache—a type of instruction cache—instead may be coupled after decoder 1325 to store recently decoded traces. Here, an instruction potentially refers to a macro-instruction (i.e. a general instruction recognized by the decoders), which may decode into a number of micro-instructions (micro-operations).

In the depicted configuration, processor 1300 also includes on-chip interface module 1310. Historically, a memory controller, which is described in more detail below, has been included in a computing system external to processor 1300. In this scenario, on-chip interface 1310 is to communicate with devices external to processor 1300, such as system memory 1375, a chipset (often including a memory controller hub to connect to memory 1375 and an I/O controller hub to connect peripheral devices), a memory controller hub, a northbridge, or other integrated circuit. And in this scenario, bus 1305 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1375 may be dedicated to processor 1300 or shared with other devices in a system. Common examples of types of memory 1375 include DRAM, SRAM, non-volatile memory (NV memory), and other known storage devices. Note that device 1380 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1300. For example in one embodiment, a memory controller hub is on the same package and/or die with processor 1300. Here, a portion of the core (an on-core portion) 1310 includes one or more controller(s) for interfacing with other devices such as memory 1375 or a graphics device 1380. The configuration including an interconnect and controllers for interfacing with such devices is often referred to as an on-core (or un-core configuration). As an example, on-chip interface 1310 includes a ring interconnect for on-chip communication and a high-speed serial point-to-point link 1305 for off-chip communication. Yet, in the SOC environment, even more devices, such as the network interface, co-processors, memory 1375, graphics processor 1380, and any other known computer devices/interface may be integrated on a single die or integrated circuit to provide small form factor with high functionality and low power consumption.

In one embodiment, processor 1300 is capable of executing a compiler, optimization, and/or translator code 1377 to compile, translate, and/or optimize application code 1376 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 14:
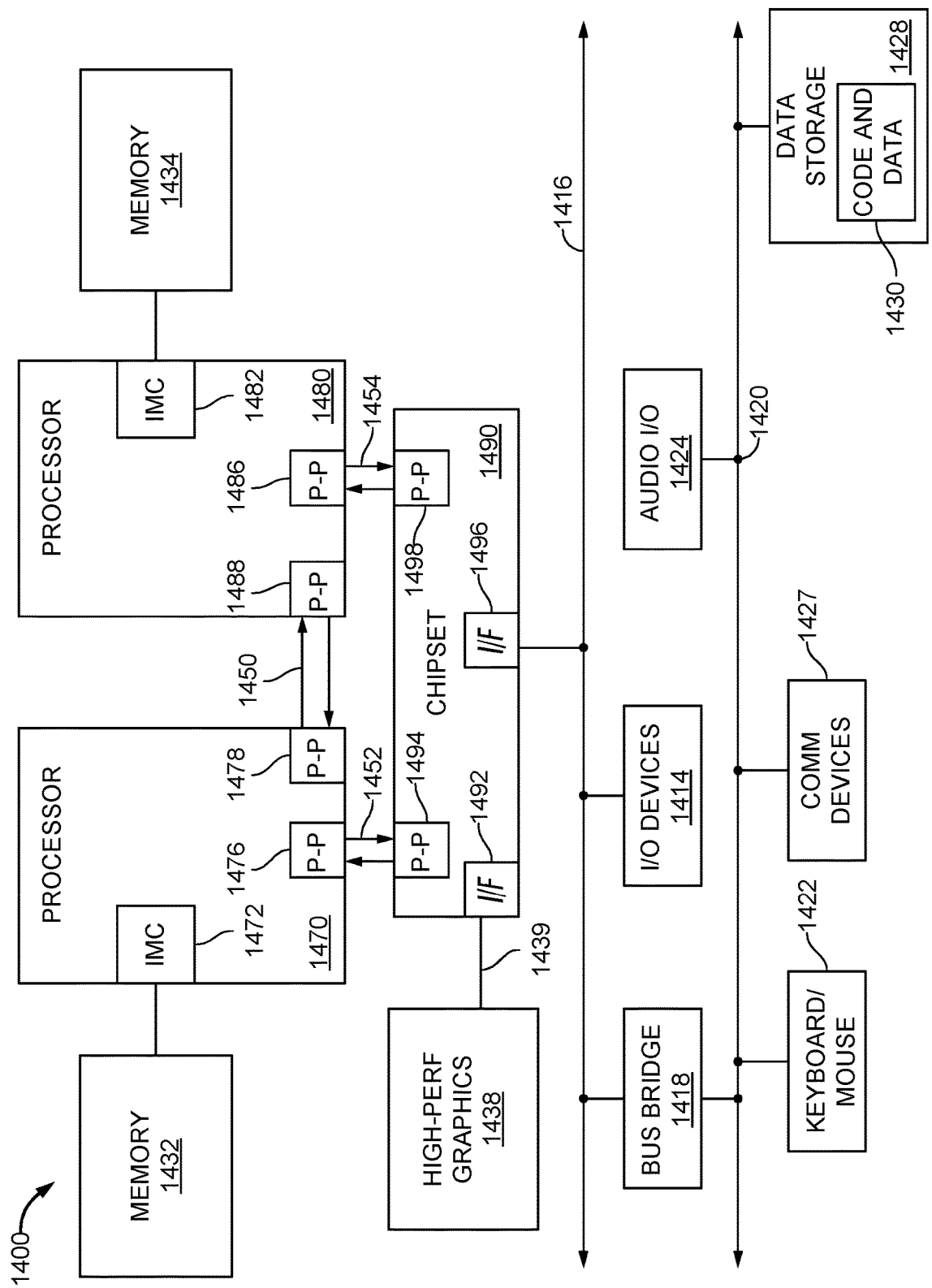
FIG. 14 illustrates an embodiment of a block for a computing system including multiple processors.

Referring now to FIG. 14, shown is a block diagram of another system 1400 in accordance with an embodiment of the present disclosure. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of a processor. In one embodiment, 1452 and 1454 are part of a serial, point-to-point coherent interconnect fabric, such as a high-performance architecture. As a result, aspects of the present disclosure may be implemented within the QPI architecture.

While shown with only two processors 1470, 1480, it is to be understood that the scope of the present disclosure is not so limited. In other embodiments, one or more additional processors may be present in a given processor.

Processors 1470 and 1480 are shown including integrated memory controller units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 each exchange information with a chipset 1490 via individual P-P interfaces 1452, 1454 using point to point interface circuits 1476, 1494, 1486, 1498. Chipset 1490 also exchanges information with a high-performance graphics circuit 1438 via an interface circuit 1492 along a high-performance graphics interconnect 1439.

A shared cache (not shown) may be included in either processor or outside of both processors; yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present disclosure is not so limited.

As shown in FIG. 14, various I/O devices 1414 are coupled to first bus 1416, along with a bus bridge 1418 which couples first bus 1416 to a second bus 1420. In one embodiment, second bus 1420 includes a low pin count (LPC) bus. Various devices are coupled to second bus 1420 including, for example, a keyboard and/or mouse 1422, communication devices 1427 and a storage unit 1428 such as a disk drive or other mass storage device which often includes instructions/code and data 1430, in one embodiment. Further, an audio I/O 1424 is shown coupled to second bus 1420. Note that other architectures are possible, where the included components and interconnect architectures vary. For example, instead of the point-to-point architecture of FIG. 14, a system may implement a multi-drop bus or other such architecture.

While aspects of the present disclosure have been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the present disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

EXAMPLES

Illustrative examples of the technologies disclosed herein are provided below. An embodiment of the technologies may include any one or more, and any combination of, the examples described below.

Example 1 includes a controller hub comprising a host message processor circuitry to receive a message from a device connected to the controller hub by a link, wherein the message comprises a device handle identifier; access an entry in a device handle table based on the device handle identifier of the message, wherein the entry in the device handle table comprises a domain identifier corresponding to a domain of the message; and process the message based on the domain identifier corresponding to the device handle identifier of the message.

Example 2 includes the subject matter of Example 1, and wherein the domain identifier comprises a bus/device/function (BDF) identifier, a processor address space identifier (PASID), or both.

Example 3 includes the subject matter of any of Examples 1 and 2, and wherein the device handle identifier is less than or equal to 12 bits, and the domain identifier is greater than or equal to 16 bits.

Example 4 includes the subject matter of any of Examples 1-3, and wherein the host message processor circuitry is further to receive a device handle allocation message from the device connected to the controller hub, wherein the device handle allocation message comprises a device handle identifier and a domain identifier; and store, in response to the device handle allocation message, the device handle identifier and the domain identifier in the device handle table.

Example 5 includes the subject matter of any of Examples 1-4, and wherein the host message processor circuitry is further to receive a device handle deallocation message from the device connected to the controller hub, wherein the device handle deallocation message comprises a device handle identifier; and deallocate, in response to the device handle deallocation message, the device handle identifier of the device handle deallocation message in the device handle table.

Example 6 includes the subject matter of any of Examples 1-5, and wherein the host message processor circuitry is further to receive a device handle deallocation message from software of a computing system that comprises the controller hub, wherein the device handle deallocation message indicates that all device handles should be deallocated; and deallocate, in response to the device handle deallocation message, all device handle identifiers in the device handle table.

Example 7 includes the subject matter of any of Examples 1-6, and wherein the message comprises a physical memory address to be accessed, wherein to process the message comprises to determine whether access to the physical memory address is permitted based on the domain identifier corresponding to the device handle identifier of the message.

Example 8 includes the subject matter of any of Examples 1-7, and wherein the entry in the device handle table comprises a trusted bit indicating whether the domain of the message is trusted, wherein to process the message comprises to process the message based on the trusted bit.

Example 9 includes the subject matter of any of Examples 1-8, and wherein the entry in the device handle table comprises one or more bits indicating a capability associated with the domain of the message, wherein to process the message comprises to process the message based on the one or more bits indicating the capability associated with the domain of the message.

Example 10 includes the subject matter of any of Examples 1-9, and wherein the controller hub is a root complex of a Peripheral Component Interconnect Express (PCIe) interconnect.

Example 11 includes the subject matter of any of Examples 1-10, and wherein the controller hub is a root complex of a Compute Express Link (CXL) interconnect.

Example 12 includes a processor comprising the controller hub of claim 1.

Example 13 includes a method comprising receiving, by a controller hub, a message from a device connected to the controller hub by a link, wherein the message comprises a device handle identifier; accessing, by the controller hub, an entry in a device handle table based on the device handle identifier of the message, wherein the entry in the device handle table comprises a domain identifier corresponding to a domain of the message; and processing, by the controller hub, the message based on the domain identifier corresponding to the device handle identifier of the message.

Example 14 includes the subject matter of Example 13, and wherein the domain identifier comprises a bus/device/function (BDF) identifier, a processor address space identifier (PASID), or both.

Example 15 includes the subject matter of any of Examples 13 and 14, and wherein the device handle identifier is less than or equal to 12 bits, and the domain identifier is greater than or equal to 16 bits.

Example 16 includes the subject matter of any of Examples 13-15, and further including receiving, by the controller hub, a device handle allocation message from the device connected to the controller hub, wherein the device handle allocation message comprises a device handle identifier and a domain identifier; and storing, by the controller hub and in response to the device handle allocation message, the device handle identifier and the domain identifier in the device handle table.

Example 17 includes the subject matter of any of Examples 13-16, and further including receiving, by the controller hub, a device handle deallocation message from the device connected to the controller hub, wherein the device handle deallocation message comprises a device handle identifier; and deallocating, by the controller hub and in response to the device handle deallocation message, the device handle identifier of the device handle deallocation message in the device handle table.

Example 18 includes the subject matter of any of Examples 13-17, and further including receiving, by the controller hub, a device handle deallocation message from software of a computing system that comprises the controller hub, wherein the device handle deallocation message indicates that all device handles should be deallocated; and deallocating, by the controller hub and in response to the device handle deallocation message, all device handle identifiers in the device handle table.

Example 19 includes the subject matter of any of Examples 13-18, and wherein the message comprises a physical memory address to be accessed, wherein processing the message comprises determining whether access to the physical memory address is permitted based on the domain identifier corresponding to the device handle identifier of the message.

Example 20 includes the subject matter of any of Examples 13-19, and wherein the entry in the device handle table comprises a trusted bit indicating whether the domain of the message is trusted, wherein processing the message comprises processing the message based on the trusted bit.

Example 21 includes the subject matter of any of Examples 13-20, and wherein the entry in the device handle table comprises one or more bits indicating a capability associated with the domain of the message, wherein processing the message comprises processing the message based on the one or more bits indicating the capability associated with the domain of the message.

Example 22 includes the subject matter of any of Examples 13-21, and wherein a processor comprises the controller hub.

Example 23 includes the subject matter of any of Examples 13-22, and wherein the controller hub is a root complex of a Peripheral Component Interconnect Express (PCIe) interconnect.

Example 24 includes the subject matter of any of Examples 13-23, and wherein the controller hub is a root complex of a Compute Express Link (CXL) interconnect.

Example 25 includes a controller hub comprising means for receiving, by a controller hub, a message from a device connected to the controller hub by a link, wherein the message comprises a device handle identifier; means for accessing an entry in a device handle table based on the device handle identifier of the message, wherein the entry in the device handle table comprises a domain identifier corresponding to a domain of the message; and means for processing the message based on the domain identifier corresponding to the device handle identifier of the message.

Example 26 includes the subject matter of Example 25, and wherein the domain identifier comprises a bus/device/function (BDF) identifier, a processor address space identifier (PASID), or both.

Example 27 includes the subject matter of any of Examples 25 and 26, and wherein the device handle identifier is less than or equal to 12 bits, and the domain identifier is greater than or equal to 16 bits.

Example 28 includes the subject matter of any of Examples 25-27, and further including means for receiving a device handle allocation message from the device connected to the controller hub, wherein the device handle allocation message comprises a device handle identifier and a domain identifier; and means for storing, in response to the device handle allocation message, the device handle identifier and the domain identifier in the device handle table.

Example 29 includes the subject matter of any of Examples 25-28, and further including means for receiving a device handle deallocation message from the device connected to the controller hub, wherein the device handle deallocation message comprises a device handle identifier; and means for deallocating, in response to the device handle deallocation message, the device handle identifier of the device handle deallocation message in the device handle table.

Example 30 includes the subject matter of any of Examples 25-29, and further including means for receiving a device handle deallocation message from software of a computing system that comprises the controller hub, wherein the device handle deallocation message indicates that all device handles should be deallocated; and means for deallocating, in response to the device handle deallocation message, all device handle identifiers in the device handle table.

Example 31 includes the subject matter of any of Examples 25-30, and wherein the message comprises a physical memory address to be accessed, wherein the means for processing the message comprises means for determining whether access to the physical memory address is permitted based on the domain identifier corresponding to the device handle identifier of the message.

Example 32 includes the subject matter of any of Examples 25-31, and wherein the entry in the device handle table comprises a trusted bit indicating whether the domain of the message is trusted, wherein the means for processing the message comprises means for processing the message based on the trusted bit.

Example 33 includes the subject matter of any of Examples 25-32, and wherein the entry in the device handle table comprises one or more bits indicating a capability associated with the domain of the message, wherein the means for processing the message comprises means for processing the message based on the one or more bits indicating the capability associated with the domain of the message.

Example 34 includes the subject matter of any of Examples 25-33, and wherein a processor comprises the controller hub.

Example 35 includes the subject matter of any of Examples 25-34, and wherein the controller hub is a root complex of a Peripheral Component Interconnect Express (PCIe) interconnect.

Example 36 includes the subject matter of any of Examples 25-35, and wherein the controller hub is a root complex of a Compute Express Link (CXL) interconnect.

Example 37 includes a processor comprising the controller hub of claim 24.

Example 38 includes a device comprising device message processor circuitry to determine a message to be sent to a controller hub; determine whether there is an entry in a device handle table associated with a domain of the message; and access, in response to a determination that there is the entry in the device handle table, the entry, wherein the entry comprises a device handle identifier corresponding to the domain of the message; and send the message to the controller hub with the device handle identifier corresponding to the domain of the message.

Example 39 includes the subject matter of Example 38, and wherein to determine whether there is an entry in the device handle table associated with the domain of the message comprises to determine whether there is an entry in the device handle table that comprises device context information that identifies the domain of the entry, wherein the device context information comprises a queue pair, a dedicated work queue, a shared work queue, or a work command of the domain.

Example 40 includes the subject matter of any of Examples 38 and 39, and wherein the domain identifier comprises a bus/device/function (BDF) identifier, a processor address space identifier (PASID), or both.

Example 41 includes the subject matter of any of Examples 38-40, and wherein the device handle identifier is less than or equal to 12 bits, and the domain identifier is greater than or equal to 16 bits.

Example 42 includes the subject matter of any of Examples 38-41, and wherein the device message processor circuitry is further to determine a second message to be sent to the controller hub; determine whether there is an entry in the device handle table associated with a domain of the second message; send, in response to a determination that there is not an entry in the device handle table associated with the domain of the second message, a device handle allocation message to the controller hub, the device handle allocation message including a domain identifier associated with a domain of the second message and a device handle identifier to associate with the domain identifier; and send the second message to the controller hub with the device handle identifier associated with the domain of the second message.

Example 43 includes the subject matter of any of Examples 38-42, and wherein the device message processor circuitry is further to determine, in response to the determination that there is not an entry in the device handle table associated with the domain of the second message, whether there is an unallocated entry in the device handle table; and send, in response to a determination that there is not an unallocated entry in the device handle table, a device handle deallocation message to the controller hub prior to sending the device handle allocation message.

Example 44 includes the subject matter of any of Examples 38-43, and wherein the device message processor circuitry is further to receive a device handle deallocation message from software of a computing system that comprises the device, wherein the device handle deallocation message indicates that all device handles should be deallocated; and deallocate, in response to the device handle deallocation message, all device handle identifiers in the device handle table.

Example 45 includes the subject matter of any of Examples 38-44, and wherein the entry in the device handle table comprises one or more bits indicating a capability associated with the domain of the message.

Example 46 includes the subject matter of any of Examples 38-45, and wherein the device comprises an accelerator device.

Example 47 includes the subject matter of any of Examples 38-46, and wherein the device is an endpoint device of a Peripheral Component Interconnect Express (PCIe) interconnect.

Example 48 includes the subject matter of any of Examples 38-47, and wherein the controller hub is an endpoint device of a Compute Express Link (CXL) interconnect.

Example 49 includes a method comprising determining, by a device, a message to be sent to a controller hub; determining, by the device, whether there is an entry in a device handle table associated with a domain of the message; and accessing, by the device and in response to a determination that there is the entry in the device handle table, the entry, wherein the entry comprises a device handle identifier corresponding to the domain of the message; and sending, by the device, the message to the controller hub with the device handle identifier corresponding to the domain of the message.

Example 50 includes the subject matter of Example 49, and wherein determining whether there is an entry in the device handle table associated with the domain of the message comprises determining whether there is an entry in the device handle table that comprises device context information that identifies the domain of the entry, wherein the device context information comprises a queue pair, a dedicated work queue, a shared work queue, or a work command of the domain.

Example 51 includes the subject matter of any of Examples 49 and 50, and wherein the domain identifier comprises a bus/device/function (BDF) identifier, a processor address space identifier (PASID), or both.

Example 52 includes the subject matter of any of Examples 49-51, and wherein the device handle identifier is less than or equal to 12 bits, and the domain identifier is greater than or equal to 16 bits.

Example 53 includes the subject matter of any of Examples 49-52, and further including determining, by the device, a second message to be sent to the controller hub; determining, by the device, whether there is an entry in the device handle table associated with a domain of the second message; sending, by the device and in response to a determination that there is not an entry in the device handle table associated with the domain of the second message, a device handle allocation message to the controller hub, the device handle allocation message including a domain identifier associated with a domain of the second message and a device handle identifier to associate with the domain identifier; and sending, by the device, the second message to the controller hub with the device handle identifier associated with the domain of the second message.

Example 54 includes the subject matter of any of Examples 49-53, and further including determining, by the device and in response to the determination that there is not an entry in the device handle table associated with the domain of the second message, whether there is an unallocated entry in the device handle table; and sending, by the device and in response to a determination that there is not an unallocated entry in the device handle table, a device handle deallocation message to the controller hub prior to sending the device handle allocation message.

Example 55 includes the subject matter of any of Examples 49-54, and further including receiving, by the device, a device handle deallocation message from software of a computing system that comprises the device, wherein the device handle deallocation message indicates that all device handles should be deallocated; and deallocating, by the device and in response to the device handle deallocation message, all device handle identifiers in the device handle table.

Example 56 includes the subject matter of any of Examples 49-55, and wherein the entry in the device handle table comprises one or more bits indicating a capability associated with the domain of the message.

Example 57 includes the subject matter of any of Examples 49-56, and wherein the device comprises an accelerator device.

Example 58 includes the subject matter of any of Examples 49-57, and wherein the device is an endpoint device of a Peripheral Component Interconnect Express (PCIe) interconnect.

Example 59 includes the subject matter of any of Examples 49-58, and wherein the controller hub is an endpoint device of a Compute Express Link (CXL) interconnect.

Example 60 includes a device comprising means for determining a message to be sent to a controller hub; means for determining whether there is an entry in a device handle table associated with a domain of the message; and means for accessing, in response to a determination that there is the entry in the device handle table, the entry, wherein the entry comprises a device handle identifier corresponding to the domain of the message; and means for sending the message to the controller hub with the device handle identifier corresponding to the domain of the message.

Example 61 includes the subject matter of Example 60, and wherein the means for determining whether there is an entry in the device handle table associated with the domain of the message comprises means for determining whether there is an entry in the device handle table that comprises device context information that identifies the domain of the entry, wherein the device context information comprises a queue pair, a dedicated work queue, a shared work queue, or a work command of the domain.

Example 62 includes the subject matter of any of Examples 60 and 61, and wherein the domain identifier comprises a bus/device/function (BDF) identifier, a processor address space identifier (PASID), or both.

Example 63 includes the subject matter of any of Examples 60-62, and wherein the device handle identifier is less than or equal to 12 bits, and the domain identifier is greater than or equal to 16 bits.

Example 64 includes the subject matter of any of Examples 60-63, and further including means for determining a second message to be sent to the controller hub; means for determining whether there is an entry in the device handle table associated with a domain of the second message; means for sending, in response to a determination that there is not an entry in the device handle table associated with the domain of the second message, a device handle allocation message to the controller hub, the device handle allocation message including a domain identifier associated with a domain of the second message and a device handle identifier to associate with the domain identifier; and means for sending the second message to the controller hub with the device handle identifier associated with the domain of the second message.

Example 65 includes the subject matter of any of Examples 60-64, and further including means for determining, in response to the determination that there is not an entry in the device handle table associated with the domain of the second message, whether there is an unallocated entry in the device handle table; and means for sending, in response to a determination that there is not an unallocated entry in the device handle table, a device handle deallocation message to the controller hub prior to sending the device handle allocation message.

Example 66 includes the subject matter of any of Examples 60-65, and further including means for receiving a device handle deallocation message from software of a computing system that comprises the device, wherein the device handle deallocation message indicates that all device handles should be deallocated; and means for deallocating, in response to the device handle deallocation message, all device handle identifiers in the device handle table.

Example 67 includes the subject matter of any of Examples 60-66, and wherein the entry in the device handle table comprises one or more bits indicating a capability associated with the domain of the message.

Example 68 includes the subject matter of any of Examples 60-67, and wherein the device comprises an accelerator device.

Example 69 includes the subject matter of any of Examples 60-68, and wherein the device is an endpoint device of a Peripheral Component Interconnect Express (PCIe) interconnect.

Example 70 includes the subject matter of any of Examples 60-69, and wherein the controller hub is an endpoint device of a Compute Express Link (CXL) interconnect.

Example 71 includes a system comprising a controller hub; and a device connected to the controller hub by a link, the device comprising device message processor circuitry to send a message to the controller hub, wherein the message comprises a device handle identifier associated with a domain of the message, the controller hub comprising host message processor circuitry to receive the message from the device; access an entry in a device handle table of the controller hub based on the device handle identifier of the message, wherein the entry in the device handle table of the controller hub comprises a domain identifier corresponding to the domain of the message; and process the message based on the domain identifier corresponding to the device handle identifier of the message.

Example 72 includes the subject matter of Example 71, and wherein the domain identifier comprises a bus/device/function (BDF) identifier, a processor address space identifier (PASID), or both.

Example 73 includes the subject matter of any of Examples 71 and 72, and wherein the device handle identifier is less than or equal to 12 bits, and the domain identifier is greater than or equal to 16 bits.

Example 74 includes the subject matter of any of Examples 71-73, and wherein the device message processor circuitry is further to determine whether there is an entry in a device handle table of the device associated with the domain of the message; and access, in response to a determination that there is the entry in the device handle table of the device associated with the domain of the message, the entry in the device handle table associated with the domain of the message prior to sending the message, wherein the entry in the device handle table of the device associated with the domain of the message comprises the device handle identifier corresponding to the domain of the message.

Example 75 includes the subject matter of any of Examples 71-74, and wherein the device message processor circuitry is further to determine whether there is an entry in a device handle table of the device associated with a domain of the message; and send, in response to a determination that there is not an entry in the device handle table of the device associated with the domain of the message, a device handle allocation message to the controller hub prior to sending the message, the device handle allocation message including the domain identifier associated with the domain of the message and the device handle identifier to associate with the domain identifier, wherein the host message processor circuitry is further to receive the device handle allocation message; and allocate the device handle identifier.

Example 76 includes the subject matter of any of Examples 71-75, and wherein the device message processor circuitry is further to determine, in response to the determination that there is not an entry in the device handle table of the device associated with the domain of the message, whether there is an unallocated entry in the device handle table of the device; and send, in response to a determination that there is not an unallocated entry in the device handle table of the device, a device handle deallocation message to the controller hub prior to sending the device handle allocation message, wherein the host message processor circuitry is further to receive the device handle deallocation message; and deallocate the device handle identifier.

Example 77 includes the subject matter of any of Examples 71-76, and wherein the host message processor circuitry is further to receive a device handle deallocation message from software of the system, wherein the device handle deallocation message received by the controller hub indicates that all device handles should be deallocated; and deallocate, in response to the device handle deallocation message received by the controller hub, all device handle identifiers in the device handle table of the controller hub, wherein the device message processor circuitry is further to receive, by the device, a device handle deallocation message from the software, wherein the device handle deallocation message received by the device indicates that all device handles should be deallocated; and deallocate, by the device and in response to the device handle deallocation message received by the device, all device handle identifiers in a device handle table of the controller hub.

Example 78 includes the subject matter of any of Examples 71-77, and wherein the message comprises a physical memory address to be accessed, wherein to process the message comprises to determine whether access to the physical memory address is permitted based on the domain identifier corresponding to the device handle identifier of the message.

Example 79 includes the subject matter of any of Examples 71-78, and wherein the entry in the device handle table comprises a trusted bit indicating whether the domain of the message is trusted, wherein to process the message comprises to process the message based on the trusted bit.

Example 80 includes the subject matter of any of Examples 71-79, and wherein the entry in the device handle table of the controller hub comprises one or more bits indicating a capability associated with the domain of the message, wherein to process the message comprises to process the message based on the one or more bits indicating the capability associated with the domain of the message.

Example 81 includes the subject matter of any of Examples 71-80, and wherein the controller hub is a root complex of a Peripheral Component Interconnect Express (PCIe) interconnect and the device is an endpoint of the PCIe interconnect.

Example 82 includes the subject matter of any of Examples 71-81, and wherein the controller hub is a root complex of a Compute Express Link (CXL) interconnect and the device is an endpoint of the CXL interconnect.

Example 83 includes the subject matter of any of Examples 71-82, and wherein the host message processor circuitry is further to send a second message to the device, wherein the second message comprises a device handle identifier associated with a domain of the second message, wherein the device message processor circuitry is further to receive the second message from the controller hub; access an entry in a device handle table of the device based on the device handle identifier of the second message, wherein the entry in the device handle table of the device comprises a domain identifier corresponding to the domain of the second message; and process the second message based on the domain identifier corresponding to the device handle identifier of the second message.

Example 84 includes the subject matter of any of Examples 71-83, and wherein the entry in the device handle table of the device comprises device context information that indicates queue pair, a dedicated work queue, a shared work queue, or a work command of the domain, wherein to process the message comprises to process the message based on the device context information.

Example 85 includes a method comprising sending, by a device of a computing system, a message to a controller hub of the computing system connected to the device by a link, wherein the message comprises a device handle identifier associated with a domain of the message; receiving, by the controller hub, the message from the device; accessing, by the controller hub, an entry in a device handle table of the controller hub based on the device handle identifier of the message, wherein the entry in the device handle table of the controller hub comprises a domain identifier corresponding to the domain of the message; and processing, by the controller hub, the message based on the domain identifier corresponding to the device handle identifier of the message.

Example 86 includes the subject matter of Example 85, and wherein the domain identifier comprises a bus/device/function (BDF) identifier, a processor address space identifier (PASID), or both.

Example 87 includes the subject matter of any of Examples 85 and 86, and wherein the device handle identifier is less than or equal to 12 bits, and the domain identifier is greater than or equal to 16 bits.

Example 88 includes the subject matter of any of Examples 85-87, and further including determining, by the device, whether there is an entry in a device handle table of the device associated with the domain of the message; and accessing, by the device and in response to a determination that there is the entry in the device handle table of the device associated with the domain of the message, the entry in the device handle table associated with the domain of the message prior to sending the message, wherein the entry in the device handle table of the device associated with the domain of the message comprises the device handle identifier corresponding to the domain of the message.

Example 89 includes the subject matter of any of Examples 85-88, and further including determining, by the device, whether there is an entry in a device handle table of the device associated with a domain of the message; sending, by the device and in response to a determination that there is not an entry in the device handle table of the device associated with the domain of the message, a device handle allocation message to the controller hub prior to sending the message, the device handle allocation message including the domain identifier associated with the domain of the message and the device handle identifier to associate with the domain identifier; receiving, by the controller hub, the device handle allocation message; and allocating, by the controller hub, the device handle identifier.

Example 90 includes the subject matter of any of Examples 85-89, and further including determining, by the device and in response to the determination that there is not an entry in the device handle table of the device associated with the domain of the message, whether there is an unallocated entry in the device handle table of the device; sending, by the device and in response to a determination that there is not an unallocated entry in the device handle table of the device, a device handle deallocation message to the controller hub prior to sending the device handle allocation message; receiving, by the controller hub, the device handle deallocation message; and deallocating, by the controller hub, the device handle identifier.

Example 91 includes the subject matter of any of Examples 85-90, and further including receiving, by the controller hub, a device handle deallocation message from software of the computing system, wherein the device handle deallocation message received by the controller hub indicates that all device handles should be deallocated; deallocating, by the controller hub and in response to the device handle deallocation message received by the controller hub, all device handle identifiers in the device handle table of the controller hub; receiving, by the device, a device handle deallocation message from the software, wherein the device handle deallocation message received by the device indicates that all device handles should be deallocated; and deallocating, by the device and in response to the device handle deallocation message received by the device, all device handle identifiers in a device handle table of the controller hub.

Example 92 includes the subject matter of any of Examples 85-91, and wherein the message comprises a physical memory address to be accessed, wherein processing the message comprises determining whether access to the physical memory address is permitted based on the domain identifier corresponding to the device handle identifier of the message.

Example 93 includes the subject matter of any of Examples 85-92, and wherein the entry in the device handle table comprises a trusted bit indicating whether the domain of the message is trusted, wherein processing the message comprises processing the message based on the trusted bit.

Example 94 includes the subject matter of any of Examples 85-93, and wherein the entry in the device handle table of the controller hub comprises one or more bits indicating a capability associated with the domain of the message, wherein processing the message comprises processing the message based on the one or more bits indicating the capability associated with the domain of the message.

Example 95 includes the subject matter of any of Examples 85-94, and wherein the controller hub is a root complex of a Peripheral Component Interconnect Express (PCIe) interconnect and the device is an endpoint of the PCIe interconnect.

Example 96 includes the subject matter of any of Examples 85-95, and wherein the controller hub is a root complex of a Compute Express Link (CXL) interconnect and the device is an endpoint of the CXL interconnect.

Example 97 includes the subject matter of any of Examples 85-96, and further including sending, by the controller hub, a second message to the device, wherein the second message comprises a device handle identifier associated with a domain of the second message; receiving, by the device, the second message from the controller hub; accessing, by the device, an entry in a device handle table of the device based on the device handle identifier of the second message, wherein the entry in the device handle table of the device comprises a domain identifier corresponding to the domain of the second message; and processing, by the device, the second message based on the domain identifier corresponding to the device handle identifier of the second message.

Example 98 includes the subject matter of any of Examples 85-97, and wherein the entry in the device handle table of the device comprises device context information that indicates queue pair, a dedicated work queue, a shared work queue, or a work command of the domain, wherein processing the message comprises processing the message based on the device context information.

Example 99 includes a system comprising means for sending, by a device, a message to a controller hub of the system connected to the device by a link, wherein the message comprises a device handle identifier associated with a domain of the message; means for receiving, by the controller hub, the message from the device; means for accessing, by the controller hub, an entry in a device handle table of the controller hub based on the device handle identifier of the message, wherein the entry in the device handle table of the controller hub comprises a domain identifier corresponding to the domain of the message; and means for processing, by the controller hub, the message based on the domain identifier corresponding to the device handle identifier of the message.

Example 100 includes the subject matter of Example 99, and wherein the domain identifier comprises a bus/device/function (BDF) identifier, a processor address space identifier (PASID), or both.

Example 101 includes the subject matter of any of Examples 99 and 100, and wherein the device handle identifier is less than or equal to 12 bits, and the domain identifier is greater than or equal to 16 bits.

Example 102 includes the subject matter of any of Examples 99-101, and further including means for determining, by the device, whether there is an entry in a device handle table of the device associated with the domain of the message; and means for accessing, by the device and in response to a determination that there is the entry in the device handle table of the device associated with the domain of the message, the entry in the device handle table associated with the domain of the message prior to sending the message, wherein the entry in the device handle table of the device associated with the domain of the message comprises the device handle identifier corresponding to the domain of the message.

Example 103 includes the subject matter of any of Examples 99-102, and further including means for determining, by the device, whether there is an entry in a device handle table of the device associated with a domain of the message; means for sending, by the device and in response to a determination that there is not an entry in the device handle table of the device associated with the domain of the message, a device handle allocation message to the controller hub prior to sending the message, the device handle allocation message including the domain identifier associated with the domain of the message and the device handle identifier to associate with the domain identifier; means for receiving, by the controller hub, the device handle allocation message; and means for allocating, by the controller hub, the device handle identifier.

Example 104 includes the subject matter of any of Examples 99-103, and further including means for determining, by the device and in response to the determination that there is not an entry in the device handle table of the device associated with the domain of the message, whether there is an unallocated entry in the device handle table of the device; means for sending, by the device and in response to a determination that there is not an unallocated entry in the device handle table of the device, a device handle deallocation message to the controller hub prior to sending the device handle allocation message; means for receiving, by the controller hub, the device handle deallocation message; and means for deallocating, by the controller hub, the device handle identifier.

Example 105 includes the subject matter of any of Examples 99-104, and further including means for receiving, by the controller hub, a device handle deallocation message from software of the system, wherein the device handle deallocation message received by the controller hub indicates that all device handles should be deallocated; means for deallocating, by the controller hub and in response to the device handle deallocation message received by the controller hub, all device handle identifiers in the device handle table of the controller hub; means for receiving, by the device, a device handle deallocation message from the software, wherein the device handle deallocation message received by the device indicates that all device handles should be deallocated; and means for deallocating, by the device and in response to the device handle deallocation message received by the device, all device handle identifiers in a device handle table of the controller hub.

Example 106 includes the subject matter of any of Examples 99-105, and wherein the message comprises a physical memory address to be accessed, wherein the means for processing the message comprises means for determining whether access to the physical memory address is permitted based on the domain identifier corresponding to the device handle identifier of the message.

Example 107 includes the subject matter of any of Examples 99-106, and wherein the entry in the device handle table comprises a trusted bit indicating whether the domain of the message is trusted, wherein the means for processing the message comprises means for processing the message based on the trusted bit.

Example 108 includes the subject matter of any of Examples 99-107, and wherein the entry in the device handle table of the controller hub comprises one or more bits indicating a capability associated with the domain of the message, wherein the means for processing the message comprises means for processing the message based on the one or more bits indicating the capability associated with the domain of the message.

Example 109 includes the subject matter of any of Examples 99-108, and wherein the controller hub is a root complex of a Peripheral Component Interconnect Express (PCIe) interconnect and the device is an endpoint of the PCIe interconnect.

Example 110 includes the subject matter of any of Examples 99-109, and wherein the controller hub is a root complex of a Compute Express Link (CXL) interconnect and the device is an endpoint of the CXL interconnect.

Example 111 includes the subject matter of any of Examples 99-110, and further including means for sending, by the controller hub, a second message to the device, wherein the second message comprises a device handle identifier associated with a domain of the second message; means for receiving, by the device, the second message from the controller hub; means for accessing, by the device, an entry in a device handle table of the device based on the device handle identifier of the second message, wherein the entry in the device handle table of the device comprises a domain identifier corresponding to the domain of the second message; and means for processing, by the device, the second message based on the domain identifier corresponding to the device handle identifier of the second message.

Example 112 includes the subject matter of any of Examples 99-111, and wherein the entry in the device handle table of the device comprises device context information that indicates queue pair, a dedicated work queue, a shared work queue, or a work command of the domain, wherein the means for processing the message comprises means for processing the message based on the device context information.

The invention claimed is:

1. A controller hub comprising:
host message processor circuitry to:
 receive a message from a device connected to the controller hub by a link, wherein the message comprises a device handle identifier;
 access an entry in a device handle table based on the device handle identifier of the message, wherein the entry in the device handle table comprises a domain identifier corresponding to a domain of the message; and
 process the message based on the domain identifier corresponding to the device handle identifier of the message.

2. The controller hub of claim 1, wherein the domain identifier comprises a bus/device/function (BDF) identifier, a processor address space identifier (PASID), or both.

3. The controller hub of claim 1, wherein the device handle identifier is less than or equal to 12 bits, and the domain identifier is greater than or equal to 16 bits.

4. The controller hub of claim 1, wherein the host message processor circuitry is further to:
receive a device handle allocation message from the device connected to the controller hub, wherein the device handle allocation message comprises a device handle identifier and a domain identifier; and
store, in response to the device handle allocation message, the device handle identifier and the domain identifier in the device handle table.

5. The controller hub of claim 1, wherein the host message processor circuitry is further to:
receive a device handle deallocation message from the device connected to the controller hub, wherein the device handle deallocation message comprises a device handle identifier; and
deallocate, in response to the device handle deallocation message, the device handle identifier of the device handle deallocation message in the device handle table.

6. The controller hub of claim 1, wherein the host message processor circuitry is further to:

receive a device handle deallocation message from software of a computing system that comprises the controller hub, wherein the device handle deallocation message indicates that all device handles should be deallocated; and deallocate, in response to the device handle deallocation message, all device handle identifiers in the device handle table.

7. The controller hub of claim 1, wherein the message comprises a physical memory address to be accessed,
wherein to process the message comprises to determine whether access to the physical memory address is permitted based on the domain identifier corresponding to the device handle identifier of the message.

8. The controller hub of claim 1, wherein the entry in the device handle table comprises a trusted bit indicating whether the domain of the message is trusted,
wherein to process the message comprises to process the message based on the trusted bit.

9. The controller hub of claim 1, wherein the entry in the device handle table comprises one or more bits indicating a capability associated with the domain of the message,
wherein to process the message comprises to process the message based on the one or more bits indicating the capability associated with the domain of the message.

10. The controller hub of claim 1, wherein the controller hub is a root complex of a Peripheral Component Interconnect Express (PCIe) interconnect.

11. The controller hub of claim 1, wherein the controller hub is a root complex of a Compute Express Link (CXL) interconnect.

12. A processor comprising the controller hub of claim 1.

13. A device comprising:
device message processor circuitry to:
determine a message to be sent to a controller hub connected to the device by a link;
determine whether there is an entry in a device handle table associated with a domain of the message; and
access, in response to a determination that there is the entry in the device handle table, the entry, wherein the entry comprises a device handle identifier corresponding to the domain of the message; and
send the message to the controller hub with the device handle identifier corresponding to the domain of the message.

14. The device of claim 13, wherein to determine whether there is an entry in the device handle table associated with the domain of the message comprises to determine whether there is an entry in the device handle table that comprises device context information that identifies the domain of the entry, wherein the device context information comprises a queue pair, a dedicated work queue, a shared work queue, or a work command of the domain.

15. The device of claim 13, wherein the device message processor circuitry is further to:
determine whether the device handle identifier is to be deallocated;
send, in response to a determination that the device handle identifier is to be deallocated, a deallocation message to the controller hub, wherein the deallocation message comprises the device handle identifier; and
deallocate, in response to the determination that the device handle identifier is to be deallocated, the device handle identifier in the device handle table.

16. The device of claim 13, wherein the device comprises an accelerator device.

17. The device of claim 13, wherein the device message processor circuitry is further to:
receive a device handle deallocation message from software of a computing system that comprises the device, wherein the device handle deallocation message indicates that all device handles should be deallocated; and
deallocate, in response to the device handle deallocation message, all device handle identifiers in the device handle table.

18. A system comprising:
a controller hub; and
a device connected to the controller hub by a link,
the device comprising device message processor circuitry to send a message to the controller hub, wherein the message comprises a device handle identifier associated with a domain of the message,
the controller hub comprising host message processor circuitry to:
receive the message from the device;
access an entry in a device handle table of the controller hub based on the device handle identifier of the message, wherein the entry in the device handle table of the controller hub comprises a domain identifier corresponding to the domain of the message; and
process the message based on the domain identifier corresponding to the device handle identifier of the message.

19. The system of claim 18, wherein the domain identifier comprises a bus/device/function (BDF) identifier, a processor address space identifier (PASID), or both.

20. The system of claim 18,
wherein the host message processor circuitry is further to:
send a second message to the device, wherein the second message comprises a device handle identifier associated with a domain of the second message,
wherein the device message processor circuitry is further to:
receive the second message from the controller hub;
access an entry in a device handle table of the device based on the device handle identifier of the second message, wherein the entry in the device handle table of the device comprises a domain identifier corresponding to the domain of the second message; and
process the second message based on the domain identifier corresponding to the device handle identifier of the second message.

21. The system of claim 20, wherein the entry in the device handle table of the device comprises device context information that identifies the domain of the entry, wherein the device context information comprises a queue pair, a dedicated work queue, a shared work queue, or a work command of the domain, wherein to process the message comprises to process the message based on the device context information.

* * * * *